US006868183B1

United States Patent
Kodaira et al.

(10) Patent No.: US 6,868,183 B1
(45) Date of Patent: *Mar. 15, 2005

(54) IMAGE PROCESSING APPARATUS, IMAGE FORMING APPARATUS, AND IMAGE PROCESSING METHOD DEPENDING ON THE TYPE OF ORIGINAL IMAGE

(75) Inventors: Naoaki Kodaira, Kawasaki (JP); Hiroaki Kubota, Kamakura (JP); Hiroki Kanno, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/528,117

(22) Filed: Mar. 17, 2000

(30) Foreign Application Priority Data

Apr. 1, 1999  (JP) ........................................... 11-094981
Apr. 1, 1999  (JP) ........................................... 11-094982

(51) Int. Cl.[7] ............................. G06K 9/46; G06K 9/34; G06K 9/36; G06K 9/32
(52) U.S. Cl. ........................ 382/203; 382/176; 382/237; 382/299
(58) Field of Search .............................. 382/168, 169, 382/170, 171, 172, 174, 175, 176, 180, 190, 195, 200, 203, 205, 237, 260, 263, 264, 299; 358/455, 461, 453, 466, 462

(56) References Cited

U.S. PATENT DOCUMENTS

| 5,287,204 | A | * | 2/1994 | Koizumi et al. ............. 358/538 |
| 5,999,646 | A | * | 12/1999 | Tamagaki .................... 382/169 |
| 6,035,064 | A | * | 3/2000 | Nakao et al. ............... 382/200 |
| 6,043,823 | A | | 3/2000 | Kodaira et al. |
| 6,134,567 | A | * | 10/2000 | Nakkiran et al. ........... 715/526 |
| 6,141,443 | A | * | 10/2000 | Nakao et al. ............... 382/174 |

OTHER PUBLICATIONS

Kuo–Chin Fan et al., "Segmentation and classification of mixed text/graphics/image documents," Pattern Recognition Letters 15, Dec. 1994, pp. 1201–1209.

* cited by examiner

Primary Examiner—Mehrdad Dastouri
(74) Attorney, Agent, or Firm—Foley & Lardner LLP

(57) ABSTRACT

The present invention presents an image processing apparatus having an input unit for inputting image data of an original image, a discriminating unit for extracting a predetermined region by using a feature of pixel of the input image data, and for discriminating an attribute of the region, a determining unit for determining the type of the image data on the basis of the distribution of the attributes of the regions, and a processing unit for processing the image data as specified depending on the type of the determined image data. In this constitution, image processing conforming to the accurate discrimination result can be applied to image data.

37 Claims, 28 Drawing Sheets

| 0 | 1 | 0 |
|---|---|---|
| 1 | −4 | 1 |
| 0 | 1 | 0 |

| PAGE DISCRIMINATION INFORMATION |
| --- |
| 0. REGION DISCRIMINATION |
| 1. UNIFORM BACKGROUND |
| 2. DOT BACKGROUND |
| 3. DOT PHOTO |
| 4. CONTINUOUS PHOTO |
| 5. INDISCRIMINATIVE |
| 6. TIME OVER |

FIG. 28A

| ORIGINAL MODE |
| --- |
| 0. CHARACTER/PHOTO |
| 1. CHARACTER |
| 2. MAP |
| 3. PRINTED PHOTO |
| 4. PHOTOGRAPHIC PRINTING PAPER PHOTO |

FIG. 28B

| ORIGINAL MODE |
| --- |
| AUTOMATIC MODE |
| CHARACTER/PHOTO MODE |
| CHARACTER MODE |
| MAP MODE |
| PRINTED PHOTO MODE |
| PHOTOGRAPHIC PRINTING PAPER PHOTO MODE |

FIG. 28C

| PAGE DISCRIMINATION INFORMATION |
| --- |
| 0. UNIFORM BACKGROUND |
| 1. DOT BACKGROUND |
| 2. DOT PHOTO |
| 3. CONTINUOUS PHOTO |

FIG. 28D

| PAGE DISCRIMINATION RESULT | | PAGE DIS-CRIMI-NATION CODE | REGION DIS-CRIMI-NATION CODE | COLOR CONVERSION | BACKGROUND PROCESSING | PIXEL DISCRIMI-NATION | FILTER | BLACK COLOR/ BLACK CHARACTER | GRADATION PROCESSING |
|---|---|---|---|---|---|---|---|---|---|
| REGION DISCRIMINATION | UNIFORM BACKGROUND | 0 | 0 | CHARACTER/ PHOTO | CHARACTER/ PHOTO | CHARACTER/ PHOTO A | CHARACTER/ PHOTO A | CHARACTER/ PHOTO | CHARACTER/ PHOTO |
| | DOT BACKGROUND | | 1 | | | CHARACTER/ PHOTO B | CHARACTER/ PHOTO B | | |
| | DOT PHOTO | | 2 | | | – | CHARACTER/ PHOTO C | | |
| | CONTINUOUS PHOTO | | 3 | | | – | CHARACTER/ PHOTO D | | |
| PAGE DISCRIMINATION | UNIFORM BACKGROUND | 1 | – | CHARACTER | CHARACTER | CHARACTER/ PHOTO A | CHARACTER/ PHOTO A | CHARACTER | CHARACTER |
| | DOT BACKGROUND | 2 | – | MAP | MAP | CHARACTER/ PHOTO B | CHARACTER/ PHOTO B | MAP | MAP |
| | DOT PHOTO | 3 | – | PRINTED PHOTO | PRINTED PHOTO | – | PRINTED/ PHOTO | PRINTED PHOTO | PRINTED PHOTO |
| | CONTINUOUS PHOTO | 4 | – | PHOTOGRAPHIC PRINTING PAPER PHOTO | PHOTOGRAPHIC PRINTING PAPER PHOTO | – | PHOTOGRAPHIC PRINTING PAPER PHOTO | PHOTOGRAPHIC PRINTING PAPER PHOTO | PHOTOGRAPHIC PRINTING PAPER PHOTO |
| | INDISCRIMINATIVE | 5 | – | CHARACTER/ PHOTO | CHARACTER/ PHOTO | CHARACTER/ PHOTO | CHARACTER/ PHOTO | CHARACTER/ PHOTO | CHARACTER/ PHOTO |
| OTHERS | TIME OUT | 6 | – | CHARACTER/ PHOTO | CHARACTER/ PHOTO | CHARACTER/ PHOTO | CHARACTER/ PHOTO | CHARACTER/ PHOTO | CHARACTER/ PHOTO |

FIG. 36

IMAGE PROCESSING APPARATUS, IMAGE FORMING APPARATUS, AND IMAGE PROCESSING METHOD DEPENDING ON THE TYPE OF ORIGINAL IMAGE

CROSS-REFERENCE TO RELATED APPLICATIONS

This application is based upon and claims the benefit of priority from the prior Japanese Patent Applications No. 11-094981, filed Apr. 1, 1999; and No. 11-094982, filed Apr. 1, 1999, the entire contents of which are incorporated herein by reference.

BACKGROUND OF THE INVENTION

The present invention relates to an image processing apparatus, an image forming apparatus, and an image processing method for performing a specified conversion process when filing or copying documents or images.

In an image forming apparatus, color or monochromatic images of color or monochromatic copier or the like are read, and copy images are formed, and when copying, a high image quality is required regardless of the type of the original image.

The image quality of the image information necessary to realize a high copy image quality differs significantly depending on the type of the original to be copied. For example, in the case of a photographic original, reproduction of color and gradation is important, and the image quality true to the original is demanded. On the other hand, in the case of a document original mainly containing characters, the clarity is demanded rather than the color of characters, and an easy-to-read image quality is required.

In a conventional copier, however, original modes optimizing the quality of copy image in various originals are available (character/photo mode, character mode, photo mode, map mode and the like), and the user selects a proper original mode depending on the type of the original to be copied, and copies the image. Herein, the character mode and photo mode are exclusive modes for character only and photo only, and in the case of a mixed original of character and photo, the character/photo mode is used. For example, this sort of the image forming apparatus is disclosed in U.S. patent application Ser. No. 08/682,007, in which the image processing apparatus can extinguish character area, a graph area, page area, and photo area from the image data, and it processes the image data corresponding to the extinguished areas.

However, discrimination of regions conducted by the apparatus is not always perfect in precision of discrimination, and wrong discrimination may occur, and therefore depending on the condition of image processing, the image quality may deteriorate extremely in a falsely discriminated region, or when regions of same type are discriminated differently, the image quality differs in the boundary of the two regions. To decrease problems due to such wrong discrimination, the difference in processing is reduced between the image types to be discriminated, and in the case of wrong discrimination, deterioration of image quality due to wrong discrimination may be made less obvious, but when the difference in processing between plural image types to be discriminated is reduced, the degree of improvement of image quality when discriminated correctly is smaller, and therefore the image quality when the original of characters only is, for example, formed in character/photo mode is inferior to the case when formed in character mode if discriminated correctly. Hence, more accurate discriminating capability of image types of original is demanded, and the image processing apparatus capable of processing the image accordingly is required.

BRIEF SUMMARY OF THE INVENTION

It is an object of the present invention to present an image processing apparatus, an image forming apparatus, and an image processing method capable of discriminating the types of original images correctly, and processing the images most efficiently suited to the type of the original image.

The present invention provides an image processing apparatus comprising input means for inputting image data of an original image; discriminating means for extracting a predetermined region by using a feature of pixel of the image data input from the input means, and for discriminating the attribute of the region; determining means for determining the type of the image data on the basis of the distribution of the regions attribute of which discriminated by the discriminating means; and processing means for processing the image data as specified depending on the type of the image data determined by the determining means.

With such constitution, the present invention discriminates attributes of image types in plural regions, and determines the image type of the entire document image on the basis of the distribution of the discriminated attributes. As a result, the image types can be determined more accurately, and correct processing is done securely depending on the image type of the document, so that an image processing apparatus capable of obtaining image data with high image quality can be presented.

The present invention further provides an image forming apparatus comprising input means for inputting image data of an original image; discriminating means for extracting a predetermined region by using a feature of pixel of the image data input from the input means, and for discriminating the attribute of the region; determining means for determining the type of the image data on the basis of the distribution of the regions attribute of which discriminated by the discriminating means; processing means for processing the image data as specified depending on the type of the image data determined by the determining means; and image forming means for forming an image on a recording medium on the basis of the image data processed as specified by the processing means.

In the present invention, as described above, in the image processing apparatus and image forming apparatus, optimum image processing is done depending on the type of the document image by the same principle of operation, so that image data and image are formed at high image quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 28A to 28D are diagrams for explaining page discriminating information and original mode;

FIG. 36 is a diagram showing the relation of original mode expressing the operation mode, page discriminating information, and processing condition of each image processing block.

DETAILED DESCRIPTION OF THE INVENTION

Figure 1:
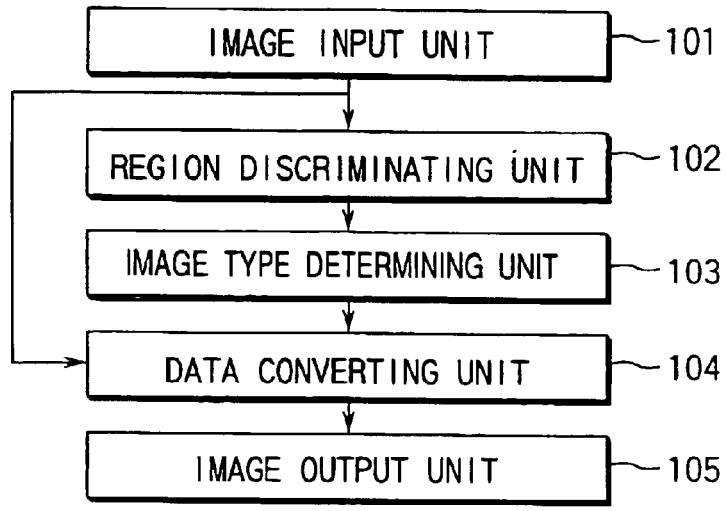
FIG. 1 is a block diagram showing a schematic constitution of an image processing apparatus in a first embodiment of the present invention.

Referring now to the drawings, embodiments of the present invention are described in detail below.

<First Embodiment>

A first embodiment of the present invention is described below. FIG. 1 shows a schematic constitution of an image processing apparatus according to the first embodiment of the present invention. In FIG. 1, the image processing apparatus comprises an image input unit 101, a region discriminating unit 102, an image type determining unit 103, a data converting unit 104, and an image forming unit 105.

The image input unit 101 is a device for inputting image data, and by an image input device such as image scanner or a device for reading a document and converting into image data, this is a device for incorporating what is depicted from document or other paper. The image input unit of the present invention may be composed of a reading device such as image scanner, or a device for incorporating image already stored in a filing device or the like as image data.

The region discriminating unit 102 is to discriminate a pixel having character as a region from the image data input from the image input unit 101. First, the image data input in the image input unit 101 is separated into a plurality of binary image data depending on the density difference of peripheral pixels, chroma and other state, and divided and extracted into each region where the character or pattern is coupled physically or logically from the image, and feature quantities such as the position of the reason, its size, shape, structure and density distribution are measured, and the attribute is determined as the document element. Attribute types of document elements include character, photograph, drawing, table, and dots.

Some specific techniques for separating into a plurality of binary image data can be used. In this case, as the output of the image separating unit 102, seven pieces of binary separate image data are created, that is, character image, half tone image, background image, dot image, color image, gray image, and black image. These techniques are already known.

Some specific techniques for extracting and for discriminating documents elements may be used.

In the region discriminating region 102, not only from single image data, feature quantities of a plurality of image data are integrated according to a rule, and the region attribute of the input image data is determined. For example, from both character image and half tone image, when regions are extracted at the same position, the type of the region and the size of the region are determined. For example, when a photo region is present on the character image, and a half tone image and a half tone pixel are present at a same position, it is determined as a continuous gradation photo region. Some specific techniques for determining the region attribute from plural pieces of image data are already known, and may be used.

The image type determining unit 103, of which detail is described below, determines feature quantities such as presence or absence of key regions such as dot and photograph, and complicatedness as document structure depending on the degree of overlapping of rectangular regions, from the results discriminated in each region such as character, photograph, drawing, table and dot in the region discriminating unit 102, and determines what kind of document is the input image data.

Herein, types of image data include, for example:

1) The background is uniform, and only characters, drawings and tables are present.

2) The background has dots, and only characters, drawings and tables are present.

3) Only dot photograph is present.

4) Only continuous photograph is present.

5) At least one of characters, drawings and tables coexists with dot photograph, and also it is possible to extract a rectangular region; or at least one of characters, drawings and tables coexists with continuous photograph, and also it is possible to extract a rectangular region.

6) At least one of characters, drawings and tables coexists with dot photograph, and it is impossible to extract a rectangular region; or at least one of characters, drawings and tables coexists with continuous photograph, and it is impossible to extract a rectangular region.

The data converting unit 104, of which detail is described later, changes the type of input image data according to the type of the document corresponding to the type of image determined in the image type determining unit 103. Change of type of image data may be, for example, change of resolution, compression rate, or number of colors. Also, the region information of attribute may be converted into an image.

The image forming unit 105 is to form an image of image data converted by the data converting unit 104 on a recording medium such as a sheet. At this time, further, it may be also saved in a storage as image file.

In such constitution, processing of the image processing apparatus of the present invention is described below.

Figure 2:
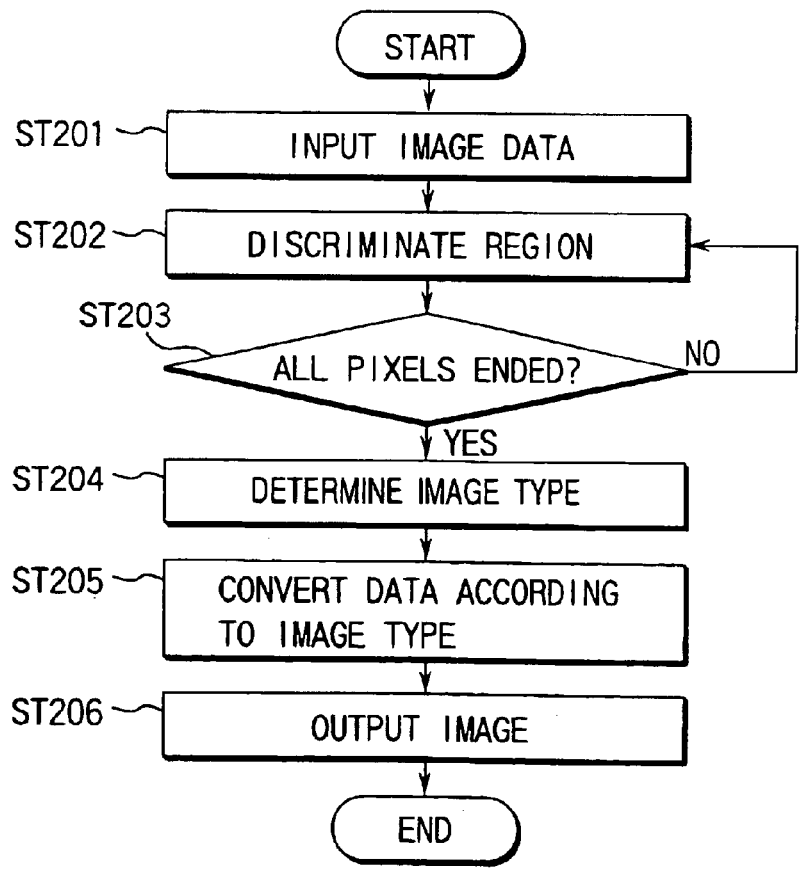
FIG. 2 is a flowchart for explaining an example of image processing in the image processing apparatus in the first embodiment.

FIG. 2 is a flowchart showing an example of document processing procedure in the image processing apparatus shown in FIG. 1. Referring to this flowchart, flow of processing of the image processing apparatus of the present invention is described below.

First, a document image is taken into the image input unit 101 (step ST201). That is, using an image input device such as scanner, the image is read from the documents, or a filing system or the like containing image file data is converted into image data by the image input unit 101.

In the region discriminating region 102, reading out one line or several lines from the image input device, data is divided into a plurality of binary image data depending on the state of each pixel such as density difference of peripheral pixel or chroma, and divided and extracted in each region in which the character or pattern is coupled physically or logically, and the type of region and degree of importance are discriminated by measuring the feature quantities such as the position of the region, its size, shape, structure and density distribution, thereby extracting character, photograph, drawing, table and dot regions (step ST202). This operation is repeated until processing of all pixels of the input image is over (step ST203).

After all pixel attributes are determined, in the image type determining unit 103, from the results discriminated in each region of character, photograph, drawing, table and dot, by determining the feature quantities such as presence or absence of key regions such as dot and photograph, and complicatedness as document structure from the degree of overlapping of rectangular regions, it is determined what kind of document is the input image data (step ST204). The detail of specific processing in the image type determining unit 103 is described later by referring to FIG. 3.

After determining the type of the document of the input image data, in the data converting unit 104, the format of image data is converted depending on the document type according to the type of the image data (step ST205). The detail of specific processing in the data converting unit 104 is described later by referring to FIG. 5.

Finally, in the image forming unit 105, the image converted in the image data format is formed on a recording medium (step ST206).

This is a rough processing operation of the image forming apparatus. The processing of individual elements is described specifically below.

Figure 3:
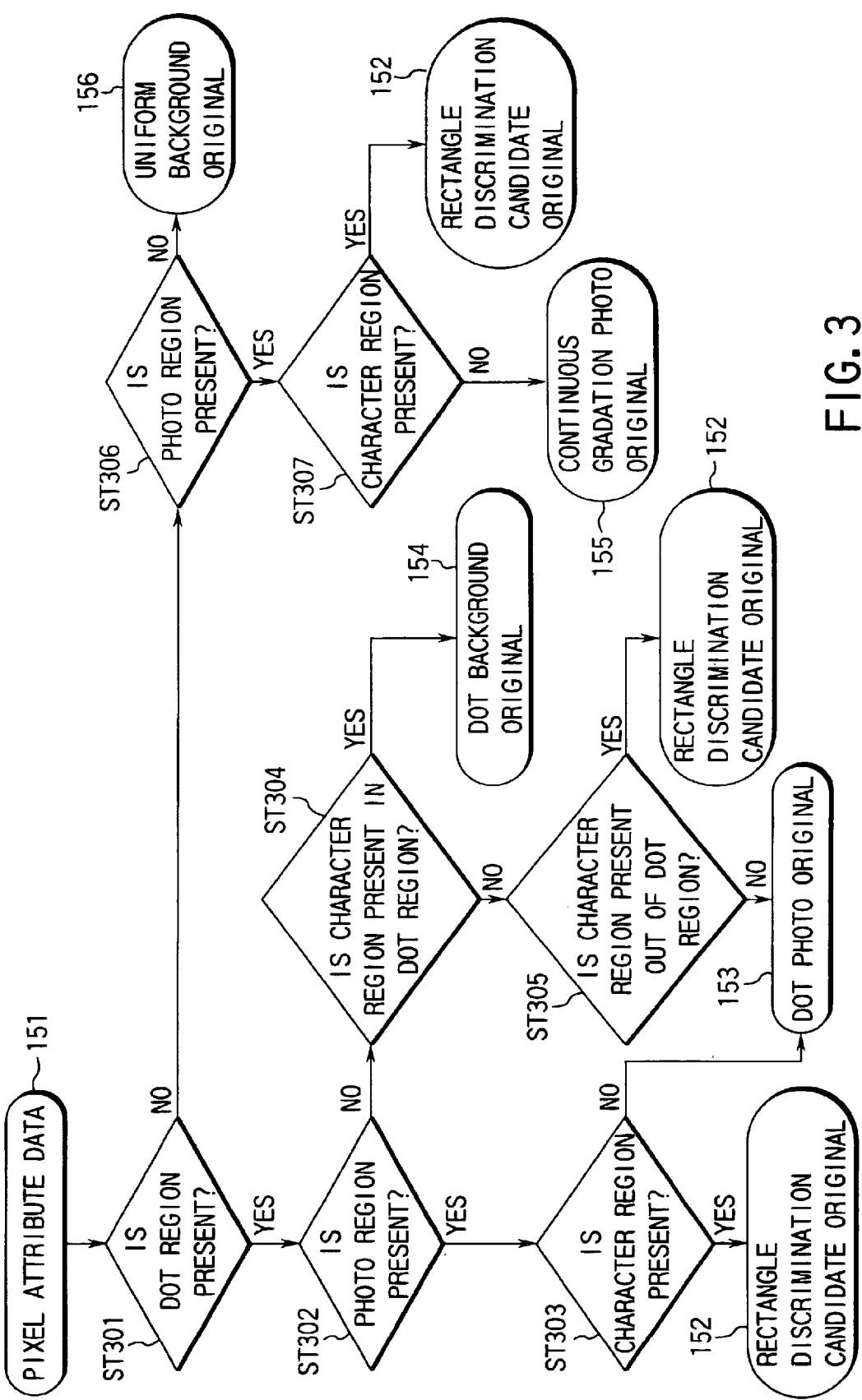
FIG. 3 is a flowchart for explaining the image type determining process in the image processing apparatus in the first embodiment.

FIG. 3 is a flowchart showing the detail of image type determining process as an example in the image type determining unit 103 of the image processing apparatus, and this is a flowchart of the process corresponding to step ST204 shown in FIG. 2. The image type determining process is a process of what kind of document is the input image data, by making use of the region discriminating result of each pixel.

In this process, first, an example of document type classification determined by the type of image data is described below.

A uniform background original document is one not having photo region and dot region. It is therefore an original of character region only or in a blank state in which nothing is written.

A dot background original is one having a dot region, and having a character region contained in the dot region.

A dot photo original is one having a dot region, and having photo region in the dot region but not having character region.

A continuous gradation photo original is one not having dot region and character region, and having photo region only.

A rectangular discrimination original does not belong to any one of uniform background original, dot background original, dot photo original, or continuous gradation photo original, and not having complicated layout structure, which can be divided into each region of character, dot, photograph, drawing, table, etc.

One having complicated layout structure, which cannot be divided into each region of character, dot, photograph, drawing, table and the like, is discriminated from other originals as an indiscriminative original.

In FIG. 3, pixel attribute data 151 is the attribute of each pixel of input image data determined by using the type and importance of the region of the plural image data discriminated in the region discriminating unit 102, and is expressed as the region of each document element.

First, reading data from the pixel attribute data 151, it is checked if dot region is present or not (step ST301). If a dot region is present, then it is checked if photo region is present or not (step ST302). If a photo region is present, then it is checked if character region is present or not (step ST303). If a character region is present, it is a rectangle discrimination candidate original 152. The rectangle discrimination candidate original 152 is classified into rectangular discriminative original or indiscriminative original, consequently by the process for verification of complicatedness of the layout structure. A detailed description of this process is given later by referring to FIG. 4.

If there is no character region at step ST303, it is a dot photo original 153.

If there is no photo region at step ST302, it is checked if character region is present in the dot region or not (step ST304). If there is a character region in the dot region, it is a dot background original 154. If there is no character region in the dot region, it is further checked if there is character region outside the dot region (step ST305). If there is no character region outside the dot region, it is a dot photo original 153. If there is a character region outside the dot region, it is a rectangle discrimination candidate original 152.

If there is no dot region at step ST301, it is checked if photo region is present or not (step ST306). If there is no photo region, it is a uniform background original 156. If there is a photo region, it is further checked if character region is present or not (step ST307). If there is no character region, it is a continuous gradation photo original 155. If there is a character region, it is a rectangle discrimination candidate original 152.

By this process, the input image data is determined in any one of rectangle discrimination candidate original 152, dot photo original 153, dot background original 154, continuous gradation photo original 155, and uniform background original 156.

Figure 4:
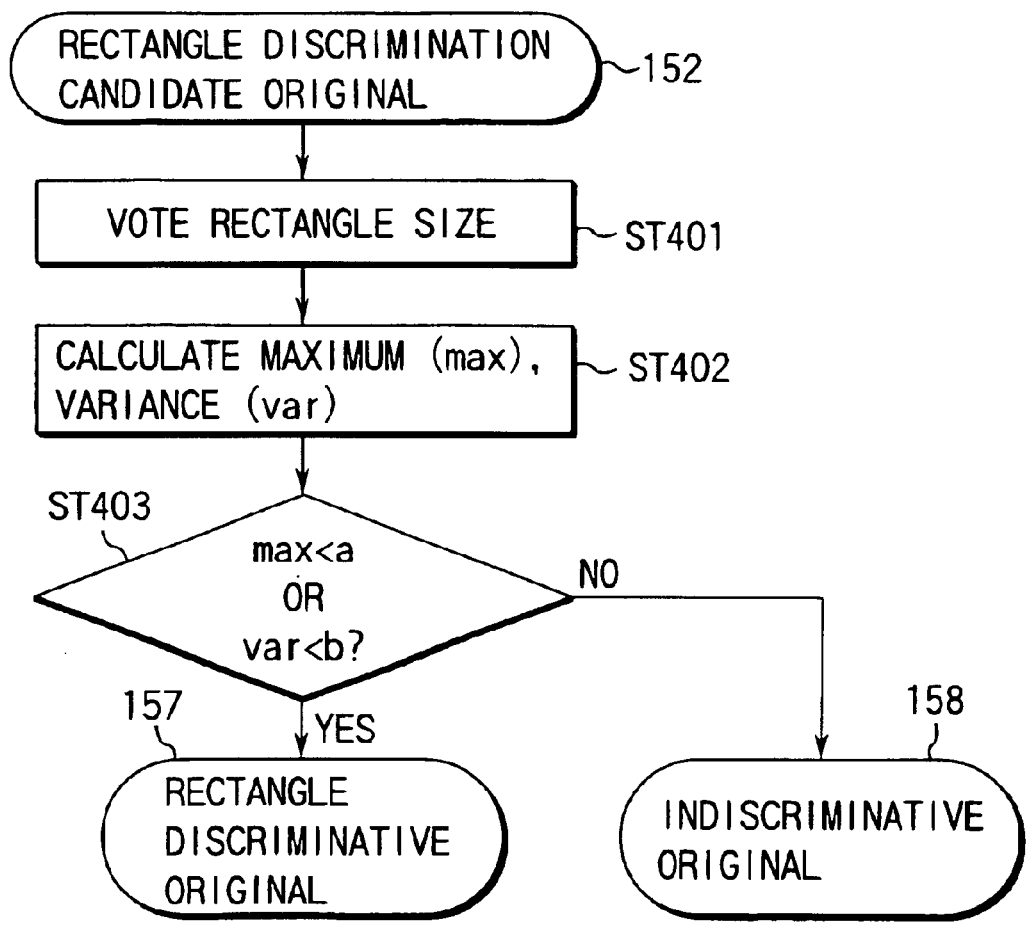
FIG. 4 is a flowchart for explaining the image type determining process in the image processing apparatus in the first embodiment.

FIG. 4 is a flowchart showing the detail of image type determining process as an example in the image type determining unit 103 of the image processing apparatus of the present invention, which is a flowchart of process corresponding to the rectangle discrimination candidate original 152 shown in FIG. 3.

When determined to be a rectangle discrimination candidate original 152, the complicatedness of the layout structure is verified, and it is classified into rectangle discriminative original or indiscriminative original, and at this time, as an index of measuring the complicatedness of the layout structure, the degree of overlapping of rectangular regions may be measured. The degree of overlapping of rectangles may be directly verified, but when the number of rectangular regions is increased, it is estimated that the number of times of comparison increases dramatically. Accordingly, by voting the rectangle size in the two-dimensional voting space being prepared, the degree of overlapping may be estimated from the state of the voting space (step ST401).

This voting space is for measuring the degree of overlapping of rectangular regions, and its resolution may be lower than the resolution of the original image. Voting is done by adding the feature such as rectangle size of the region to the position where the coordinate position of the rectangular region is converted into the coordinate position of the voting space. An example of rectangle size is width, height or area of the rectangle. Besides, the voting value may be weighted according to the attribute of the rectangular region, that is, the character, photograph, drawing, table, dot or other attribute. For example, the attribute having a great effect on the layout structure, such as photograph, drawing and table is provided with a large weight, and the character has a small weight, so that the voting value is large in the overlapped region of photograph or drawing and table. Considering the complicatedness of the layout structure, overlapping of photograph or drawing and table is classified into a complicate category. Therefore, in this case, it is easy to regard as a complicated structure. For faster processing, moreover, it is also possible to limit the rectangular region to be voted. For example, a small character region does not always have a large effect in determination of layout structure. In such a case, by limiting the rectangle size to be voted, the number of times of voting is saved, and a faster processing is expected. However, if the character region existing in image data is composed of small character regions alone, it cannot be always ignored. In such a case, it is possible to adjust the limitation depending on the state of the pixel attribute data which is the output of the region discriminating unit 102.

When voting of rectangle size in all voting spaces is over, the feature quantities in the voting spaces are measured (step ST402). As the feature quantity, for example, the statistic value of maximum or variance may be used, or, regarding the voting space to be a multi-value image, the region may be extracted after binary processing. In the former case, it is possible to determine by comparison between the calculated value and the preset threshold, and in the latter case it is possible to determine by measuring the graphic feature of the extracted region. At step ST402, the former example is employed. In this case, if the maximum (max) or variance (var) is smaller than the threshold (a) or (b), the layout structure is regarded not complicated, and is determined to be a rectangle discriminative original 157, and if larger, to the contrary, the layout structure is regarded complicated, and is determined to be an indiscriminative original 158 (step ST403).

This is the detailed description of the image type determining unit 103, and, as a result, the input image data is determined as any one of dot photo original 153, dot background original 154, continuous gradation photo original 155, uniform background original 156, rectangle discriminative original 157, and indiscriminative original 158.

Figure 5:
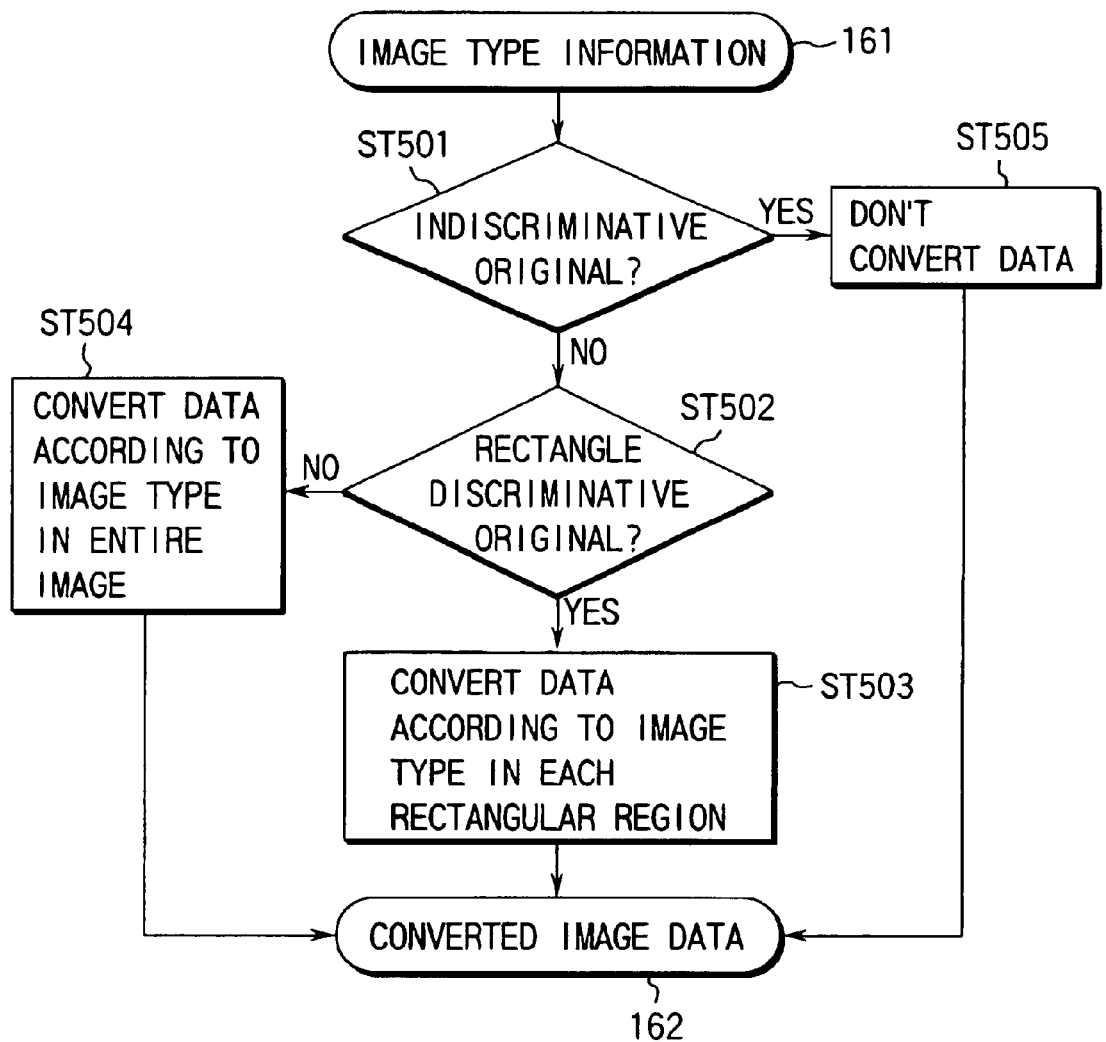
FIG. 5 is a flowchart for explaining the data converting process in the image processing apparatus in the first embodiment.

FIG. 5 is a flowchart showing the detail of data conversion process as an example in the data converting unit 104 of the image processing apparatus, which is a flowchart of the process corresponding to step ST205 in FIG. 2. The data conversion process is a process for changing the format of the input image data by making use of the determining result of image type.

The image type information 161 is the output of the image type determining unit 103, and expresses the type of input image data, which is one of dot photo original 153, dot background original 154, continuous gradation photo original 155, uniform background original 156, rectangle discriminative original 157, and indiscriminative original 158.

First, it is checked if the image type information 161 is an indiscriminative original or not (step ST501). If not indiscriminative original, next it is checked if rectangle discriminative original or not (step ST502). In the case of rectangle discriminative original, making use of the information of the pixel attribute obtained in the region discriminating unit 102, the data conversion process is executed on the input image data in every rectangular region (step ST503).

Data conversion process is, for example, change of resolution, compression rate, or number of colors. A rule of data conversion process may be preset in every pixel attribute, and the data conversion process may be done according to this rule. For example, in the case of dot photo region or continuous photo region, if the resolution is lowered or the compression rate is raised, image deterioration may not be obvious, and the quantity of information can be curtailed. Or if only black characters are present in the character region, the multi-value data may be converted into two-value data, so that the quantity of information can be curtailed. In this way, by presetting a specific rule of data conversion process in every pixel attribute, it is possible to convert into efficient image data.

As a result of data conversion process, converted image data 162 is output.

If it is not rectangle discriminative original at step ST502, the entire image is uniformly processed by data conversion (step ST504). As uniform data conversion process, for example, in the case the image type information 161 is dot photo original or continuous gradation photo, if the resolution is lowered or the compression rate is raised, image deterioration may not be obvious, so that the quantity of information may be curtailed. Or when the image type information 161 is uniform background original and there are only black characters, the multi-value data may be converted into two-value data, so that the quantity of information can be similarly curtailed. In this way, similarly to at step ST503, by presetting a specific rule of data conversion process in every image type, it is possible to convert into efficient image data. In this case, unlike step ST503, without processing data conversion in every rectangular region, since the same process is applied on the entire image, the processing speed is higher.

As a result of data conversion process, similarly to at step ST503, converted image data 162 is output.

In the case of indiscriminative original at step ST501, without processing data conversion by using the information of the pixel attribute obtained in the region discriminating unit 102, the input image data is directly output as corrected image data (step ST505). Meanwhile, the data conversion process (step ST503 and step ST504) is not limited to processing of input image data such as change of resolution, compression rate and number of color, but also includes, as mentioned above, the process of converting the attribute region information into image data.

Thus, since the data conversion is processed according to the determined type of the image data by determining the type of the input image data from the result of discriminating the region, it is possible to convert into efficient image data having less deterioration of image quality.

<Second Embodiment>

A second embodiment of the present invention is described next. The second embodiment is shown in FIG. 6, and relates to an image processing apparatus for correcting image data by appropriate density conversion or filter processing, according to the result of discriminating the type of image.

Figure 6:
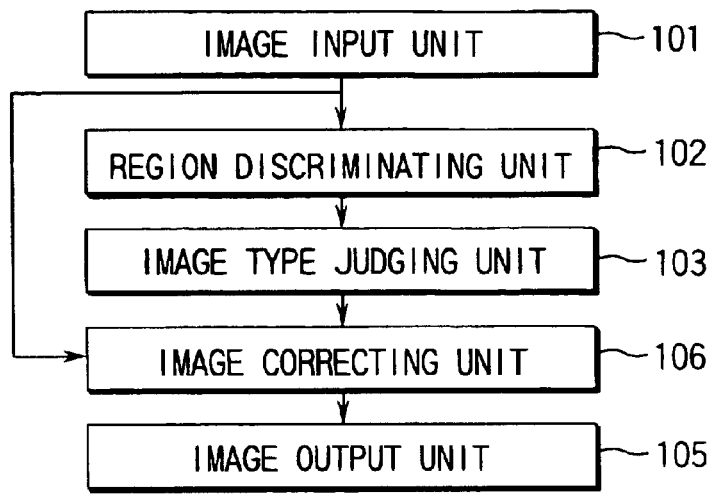
FIG. 6 is a block diagram showing a schematic constitution of an image processing apparatus in a second embodiment of the present invention.

FIG. 6 schematically shows the constitution of the image processing apparatus of the second embodiment. In FIG. 6, the image processing apparatus comprises an image input unit 101, a region discriminating unit 102, an image type determining unit 103, an image correcting unit 106, and an image forming unit 105, in which the image correcting unit 106 corresponds to the data converting unit 104 in the first embodiment shown in FIG. 1. The image input unit 102, region discriminating unit 102, image type determining unit 103, and image forming unit 105 are already explained, and the image correcting unit 106 is described below.

Figure 7:
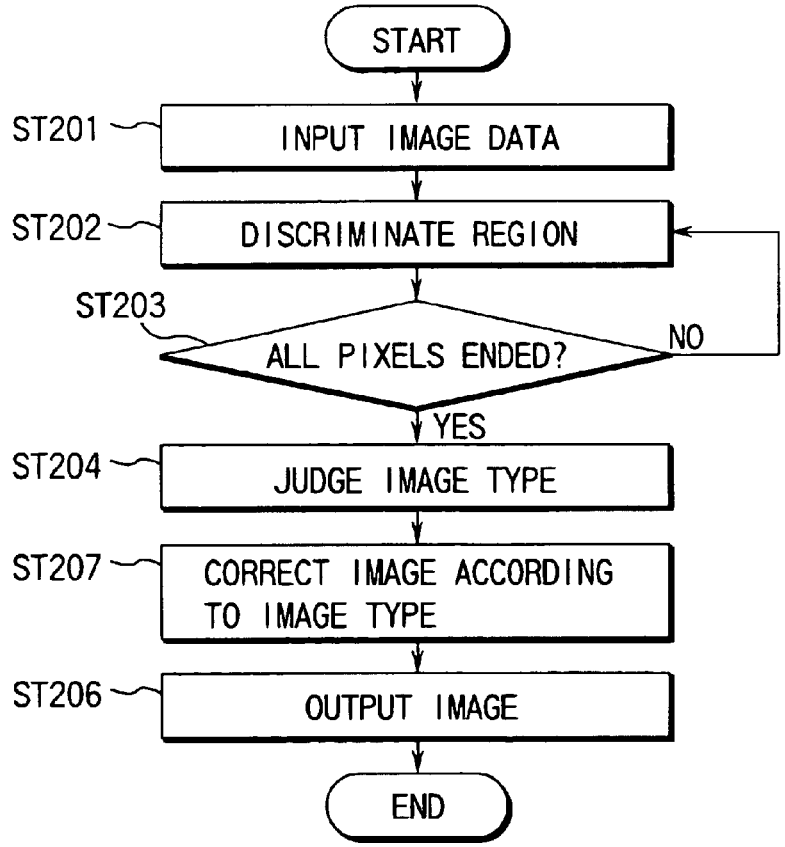
FIG. 7 is a flowchart for explaining an example of image processing in the image processing apparatus in the second embodiment.

FIG. 7 is a flowchart showing an example of document processing procedure in the image processing apparatus shown in FIG. 6. Of the flowchart of the constitution in FIG. 1 shown in FIG. 2, herein, the data conversion process (step ST205) is changed to image correction process (step ST207).

After determining the document type of the image data input in the image type determining unit 103, in the image correcting unit 106, the image data is corrected by appropriate density conversion or filter processing according to the document type corresponding to the type of the image data (step ST207).

Figure 8:
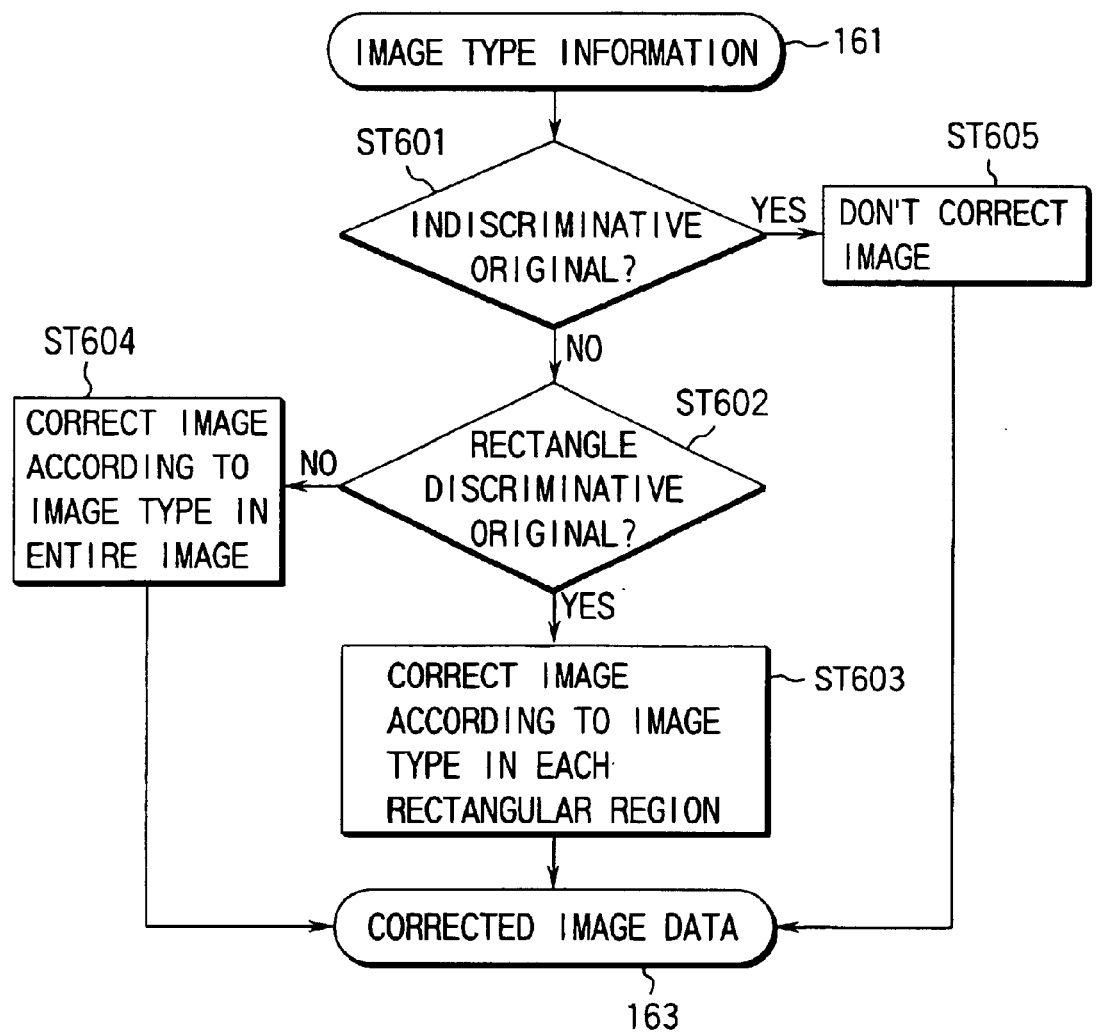
FIG. 8 is a flowchart for explaining the image correcting process in the image processing apparatus in the second embodiment.

FIG. 8 is a flowchart showing the detail of image correction process as an example in the image correcting unit 106, which is a flowchart of the process corresponding to step ST207 shown in FIG. 7.

The image type information 161 is the output of the image type determining unit 103, and expresses the type of input image data, which is one of dot photo original 153, dot background original 154, continuous gradation photo original 155, uniform background original 156, rectangle discriminative original 157, and indiscriminative original 158.

First, it is checked if the image type information 161 is an indiscriminative original or not (step ST601). If not indiscriminative original, next it is checked if rectangle discriminative original or not (step ST602). In the case of rectangle discriminative original, making use of the information of the pixel attribute obtained in the region discriminating unit 102, the image correction process is executed on the input image data in every rectangular region (step ST603).

Image correction process is, for example, density conversion process or filtering process. A rule of image correction process may be preset in every pixel attribute, and the image correction process may be done according to this rule. For example, in the case of character region, high pass filter may be processed so that the characters may be more clear, or in the case of dot photo region, low pass filter may be processed to obtain a smooth image without moiré. As a result, being corrected into image data of high quality, it may be output as corrected image data 163. In this way, by presetting a specific rule of image correction process in every pixel attribute, it is possible to correct into image data of high quality.

If it is not rectangle discriminative original at step ST602, the entire image is uniformly processed by image correction (step ST604). As uniform image correction process, for example, in the case of uniform background original, the entire image may be processed by high pass filter so that the characters may be clear, or in the case of dot photo region, the entire image may be processed by low pass filter to obtain a smooth image without moiré. In this way, similarly to at step ST603, by presetting a specific rule of image correction process in every image type, it is possible to correct into image data of high quality. In this case, unlike step ST603, without processing image correction in every rectangular region, since the same process is applied on the entire image, the processing speed is higher. As a result of image correction process, similarly to at step ST603, corrected image data 163 is output.

In the case of indiscriminative original at step ST601, without processing image correction by using the information of the pixel attribute obtained in the region discriminating unit 102, the input image data is directly output as corrected image data (step ST605).

Thus, since the image correction is processed according to the determined type of the image data by determining the type of the input image data from the result of discriminating the region, it is possible to obtain image data of high quality.

<Third Embodiment>

A third embodiment of the present invention is described below. The third embodiment is shown in FIG. 9, and relates to an image processing apparatus for selecting the image format to be stored, converting into this format, and storing, according to the result of discriminating the type of image when filing the image.

Figure 9:
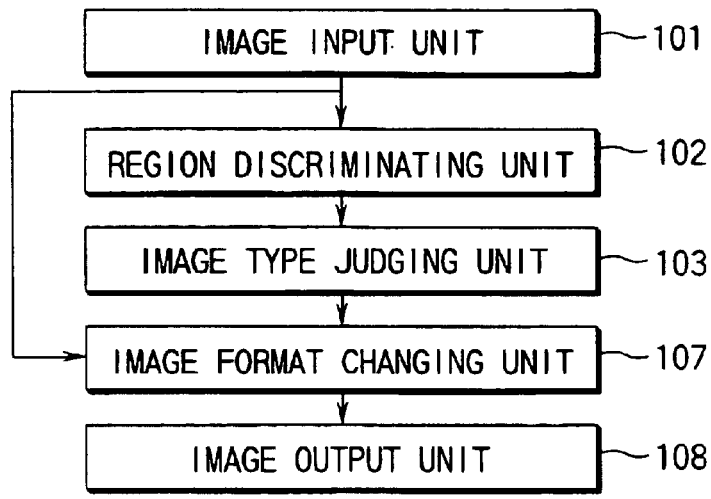
FIG. 9 is a block diagram showing a schematic constitution of an image processing apparatus in a third embodiment of the present invention.

FIG. 9 schematically shows the constitution of the image processing apparatus of the third embodiment. In FIG. 9, the image processing apparatus comprises an image input unit 101, a region discriminating unit 102, an image type determining unit 103, an image format changing unit 107, and an image forming unit 105, in which the image format changing unit 107 corresponds to the data converting unit 104 and an image memory unit 108 corresponds to the image forming unit 105 in the first embodiment shown in FIG. 1. The image input unit 102, region discriminating unit 101, and image type determining unit 103 are already explained and are omitted herein. An image memory unit 108 is the output destination after conversion of image format, and is substantially regarded to operate same as the image forming unit 105. Therefore, the image format changing unit 107 is described below.

Figure 10:
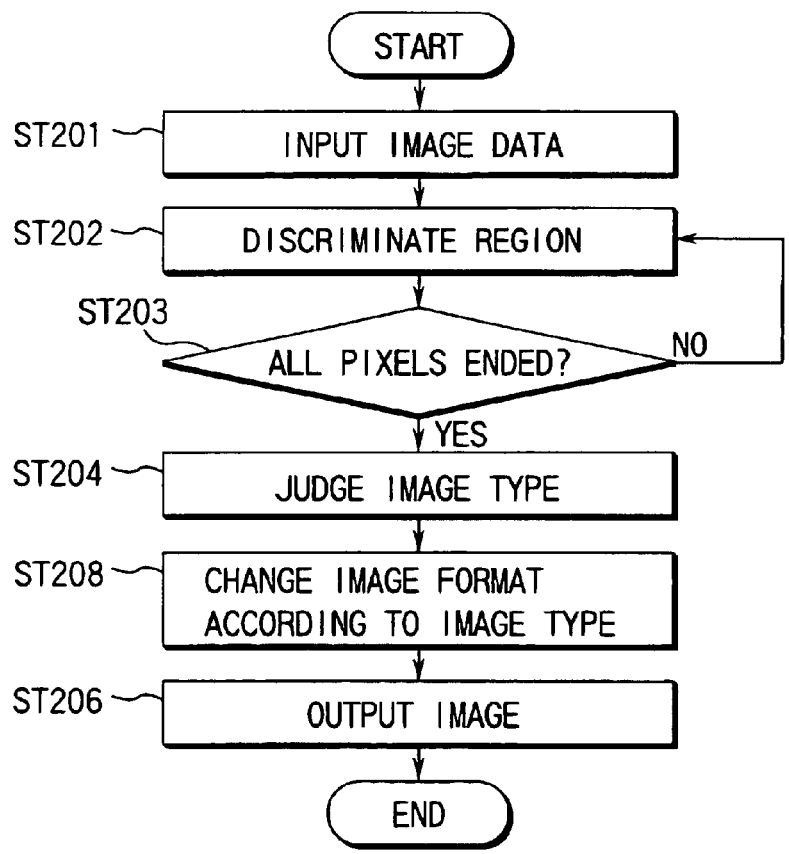
FIG. 10 is a flowchart for explaining an example of image processing in the image processing apparatus in the third embodiment.

FIG. 10 is a flowchart showing an example of document processing procedure in the image processing apparatus shown in FIG. 9. Of the flowchart of the constitution in FIG. 1 shown in FIG. 2, herein, the data conversion process (step ST205) is changed to image format changing process (step ST208).

After determining the document type of the image data input in the image type determining unit 103, in the image format changing unit 107, the image format suited to be stored in the image memory unit 108 is selected according to the document type corresponding to the type of the image data, and it is converted to this format (step ST208).

Figure 11:
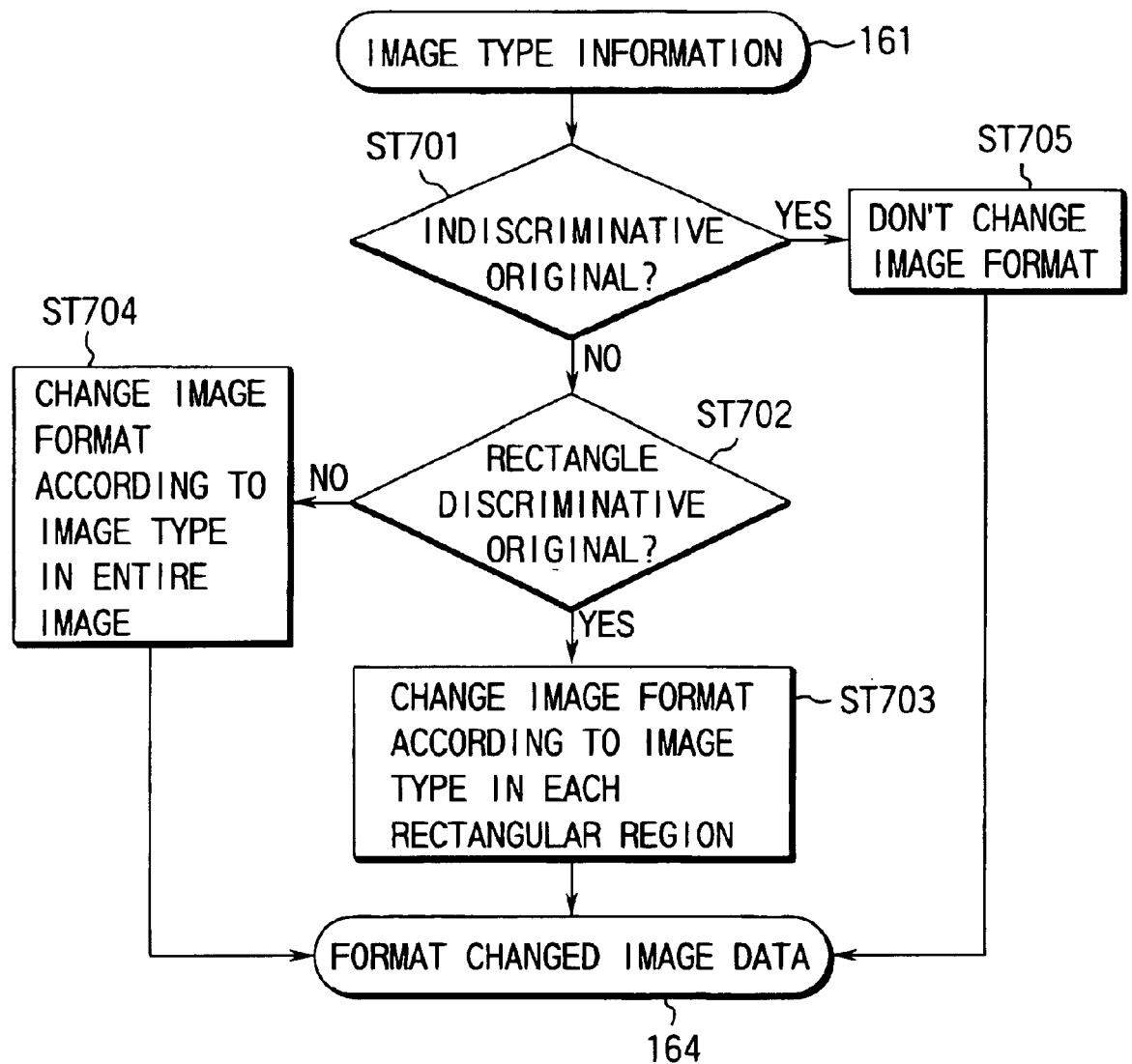
FIG. 11 is a flowchart for explaining the image type changing process in the image processing apparatus in the third embodiment.

FIG. 11 is a flowchart showing the detail of image format conversion process as an example in the image format changing unit 107, which is a flowchart of the process corresponding to step ST208 shown in FIG. 10.

The image type information 161 is the output of the image type determining unit 103, and expresses the type of input image data, which is one of dot photo original 153, dot background original 154, continuous gradation photo original 155, uniform background original 156, rectangle discriminative original 157, and indiscriminative original 158.

First, it is checked if the image type information 161 is an indiscriminative original or not (step ST701). If not indiscriminative original, next it is checked if rectangle discriminative original or not (step ST702). In the case of rectangle discriminative original, making use of the information of the pixel attribute obtained in the region discriminating unit 102, the image format conversion process is executed on the input image data in every rectangular region (step ST703).

The image format includes, for example, JPEG format and TIFF (G4) format. A rule of image format conversion process may be preset in every pixel attribute, and the image format conversion process may be done according to this rule. For example, in the case of character region, the quantity of data can be curtailed by converting into the TIFF (G4) format, and it is changed into efficient image data. Or, in the case of dot photo region or continuous gradation photo region, by converting into the JPEG format, the quantity of data can be compressed while suppressing deterioration of image quality, and in this case, too, it is changed into efficient image data. As a result, it can be stored as format converted image data 164. In this case, from one image data, plural formats of image data are generated. When storing, therefore, they may be stored individually. At this time, the structure of the original image data and the format converted image data name generated therefrom may be saved as reference file, and when restoring, by referring to this reference file, the original image data may be reconstructed from the format converted image data 164. In this way, by presetting a specific rule of image format conversion process in every pixel attribute, it is possible to convert into image data format of high efficiency by curtailing the quantity of data.

If it is not rectangle discriminative original at step ST702, the entire image is uniformly processed by image format conversion (step ST704). As uniform image format conversion process, for example, in the case of uniform background original, which does not include photograph, by converting into TIFF (G4) format, the quantity of data can be curtailed, or in the case of dot photo original or continuous gradation photo original, by converting into the JPEG format, the quantity of data can be compressed while suppressing deterioration of image quality. In this way, similarly to at step ST703, by presetting a specific rule of image format conversion process in every image type, it is possible to convert into image data format of high efficiency reduced in the quantity of data. In this case, unlike step ST703, without processing image format conversion in every rectangular region, since the same process is applied on the entire image, the processing speed of image format conversion is higher, and plural image formats are not generated, and therefore the reference file is not needed, and the original image data can e restored at high speed from the stored format converted image data. As a result of image format conversion process, similarly to at step ST703, it can be stored as format converted image data 164.

In the case of indiscriminative original at step ST701, without processing image format conversion by using the information of the pixel attribute obtained in the region discriminating unit 102, the input image data is directly output as format converted image data (step ST705).

Thus, since the image format conversion is processed according to the determined type of the image data by determining the type of the input image data from the result of discriminating the region, it is possible to change into image data of high efficiency, and the quantity of information when storing can be curtailed.

<Fourth Embodiment>

A fourth embodiment of the present invention is described below. The fourth embodiment is shown in FIG. 12, and relates to an image processing apparatus for selecting the application to be started, determining the starting parameter, and starting the application, according to the result of determining the type of the image.

Figure 12:
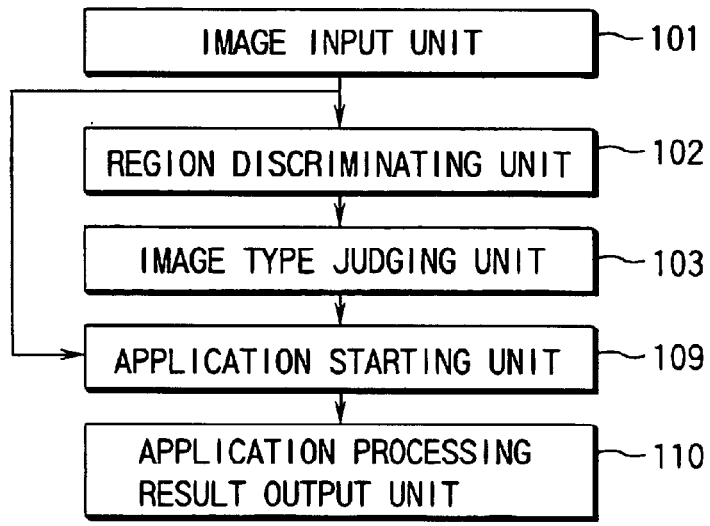
FIG. 12 is a block diagram showing a schematic constitution of an image processing apparatus in a fourth embodiment of the present invention.

FIG. 12 schematically shows the constitution of the image processing apparatus of the fourth embodiment. In FIG. 12, the image processing apparatus comprises an image input unit 101, a region discriminating unit 102, an image type determining unit 103, an application starting unit 109, and an application processing result forming unit 110, in which the application starting unit 109 corresponds to the data converting unit 104 and the application processing result forming unit 110 corresponds to the image forming unit 105 in the first embodiment shown in FIG. 1. The image input unit 101, region discriminating unit 102, and image type determining unit 103 are already explained and are omitted herein. The application processing result forming unit 110 is the output destination of the result of processing after starting the application, and is substantially regarded to operate same as the image forming unit 105. Therefore, the application starting unit 109 is described below.

Figure 13:
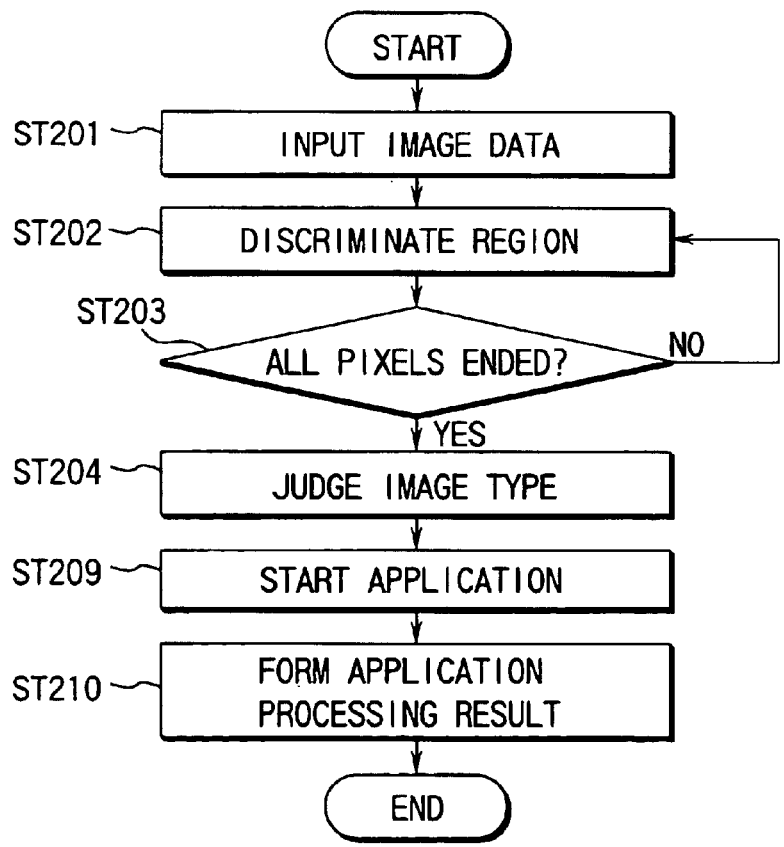
FIG. 13 is a flowchart for explaining an example of image processing in the image processing apparatus in the fourth embodiment.

FIG. 13 is a flowchart showing an example of document processing procedure in the image processing apparatus shown in FIG. 12. Of the flowchart of the constitution in FIG. 1 shown in FIG. 2, herein, the data conversion process (step ST205) is changed to application starting process (step ST209) and the image forming process (step ST206) is changed to application processing result forming process (step ST210).

After determining the document type of the image data input in the image type determining unit 103, in the application starting unit 109, an application suited to image processing according to the type of the document corresponding to the type of the image date is selected, the starting parameter is determined, and the application is started (step ST209).

Figure 14:
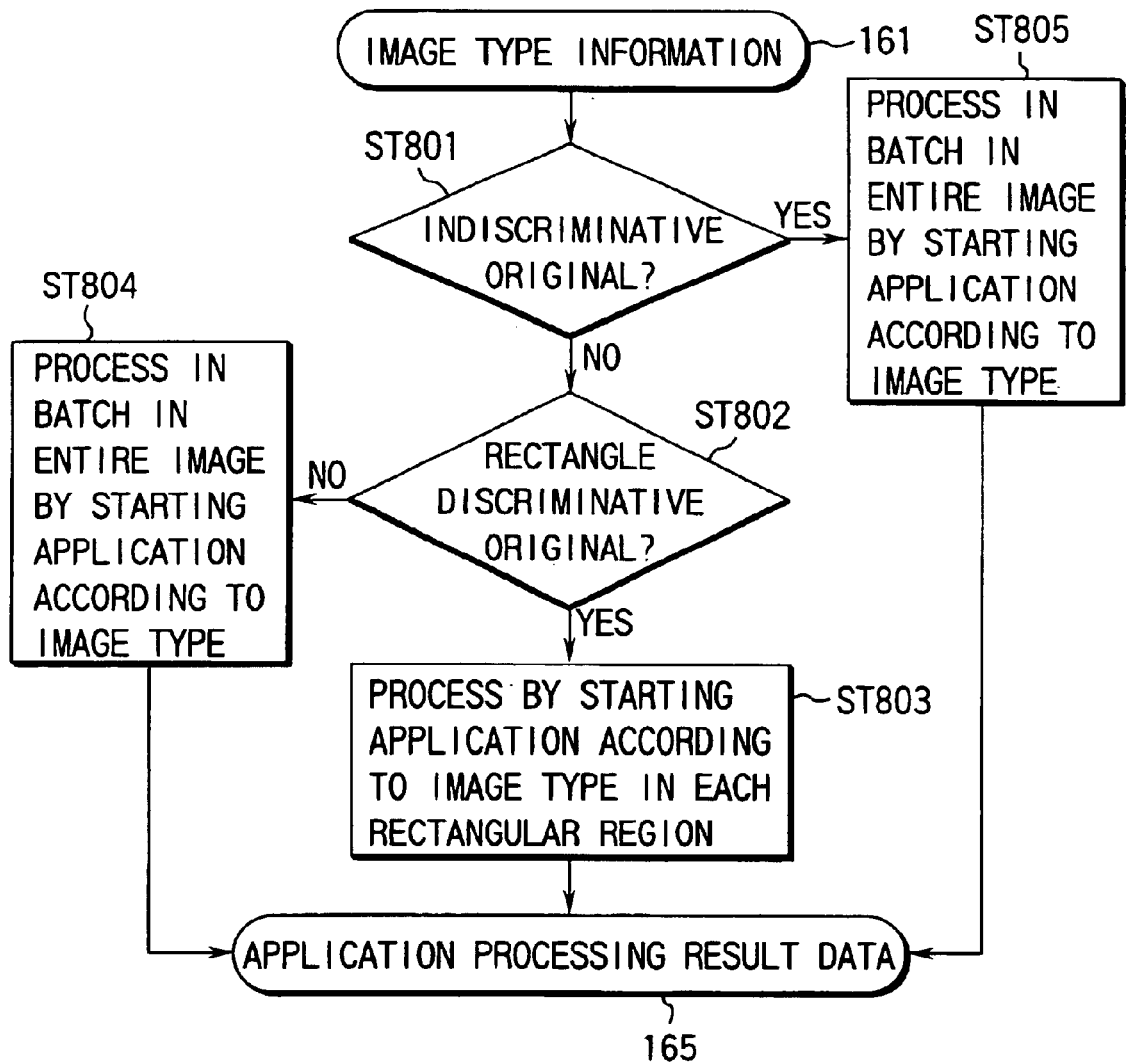
FIG. 14 is a flowchart for explaining the application starting process in the image processing apparatus in the fourth embodiment.

FIG. 14 is a flowchart showing the detail of application starting process as an example in the application starting unit 109, which is a flowchart of the process corresponding to step ST209 shown in FIG. 13.

The image type information 161 is the output of the image type determining unit 103, and expresses the type of input image data, which is one of dot photo original 153, dot background original 154, continuous gradation photo original 155, uniform background original 156, rectangle discriminative original 157, and indiscriminative original 158.

First, it is checked if the image type information 161 is an indiscriminative original or not (step ST801). If not indiscriminative original, next it is checked if rectangle discriminative original or not (step ST802). In the case of rectangle discriminative original, making use of the information of the pixel attribute obtained in the region discriminating unit 102, the application is started on the input image data in every rectangular region, and various image processings are done (step ST803).

The application includes, for example, image filing, printing, facsimile transmission, layout understanding, character recognition, rule extraction and other image processings. A rule of application for starting may be preset in every pixel attribute, and the application starting process may be done according to this rule. For example, in the case of character region, by layout understanding, the column setting or other document structure may be recognized, and the characters may be encoded by character recognition. Or, in the case of dot photo region or continuous gradation photo region, the image filing may be started in order to save the image, or when printing, if the region is color, by attaching a starting parameter of color, the printer at the output destination may be automatically changed to a color printer. The result processed by the application is the application processing result data 165, which may be provided in various formats such as printout, file, or character recognition result. By thus presetting the rule of application starting process in every pixel attribute, as soon as the image data is input, various processings may be done automatically.

If it is not rectangle discriminative original at step ST802, the entire image is uniformly processed by starting the application (step ST804). As uniform image format conversion process, for example, in the case of uniform background original, which does not include photograph, by layout understanding, the document structure such as paragraph is recognized, and the character can be encoded by character recognition, or in the case of dot photo original or continuous gradation photo original, the image filing may be started for saving the image, or printing or facsimile transmission can be done directly. The result of processing by the application is, similarly to at step ST803, it is the application process result data 165, and various formats may be provided, such as printout, file and character recognition result.

In the case of indiscriminative original at step ST801, without application starting process by using the information of the pixel attribute obtained in the region discriminating unit 102, the input image data is directly output as application process result data, or by starting the image filing or the like, the image data is directly stored as file, and the processing may be selected later by the determination of the user (step ST805).

Thus, since the application for processing the image is started according to the determined type of the image data by determining the type of the input image data from the result of discriminating the region, it is possible to perform various processes as soon as the image data is input, so that the labor may be saved.

As described herein, the image processing apparatus of the present invention is designed to incorporate a document image through an image input unit 101, extract one physically or logically coupled from the status of data of each pixel and adjacent pixels in the region discriminating unit 102 as one region, measure the feature quantities such as position, size, shape, structure and density distribution of each region on the image, and discriminate the measured result as a region having the attribute such as character, photograph, dot or the like as the document constituent element according to a predetermined rule. On the basis of the attribute information or the like, the type of the document depending on the type of the image data is determined from the feature such as complicatedness of the entire document image input in the image type determining unit 103, and the image data format is converted in the data converting unit 104 depending on the type of the document corresponding to the type of the image data.

In the image correcting unit 106, by processing to correct the image data by adequate density conversion or filter processing according to the type of the document corresponding to the type of the image data, in the image format changing unit 107, the image format suited to be stored in the image memory 108 is selected according to the document type corresponding to the type of the image data, and it is processed to be converted into this format.

Further, in the application starting unit 109, selecting an application suited to image processing according to the type of the document corresponding to the type of the image data, the starting parameter is determined, and it is made possible to process to start the application.

Therefore, in the original image data input in the apparatus, by extracting the region by distinguishing the different document elements such as character, photograph, drawing, table, and dot, the feature quantities such as presence or absence of key region such as dot and photograph, and complicatedness as document structure from the degree of overlapping of rectangular region are determined, and hence it is possible to determine what kind of document is the input image data, and by making use of the determining result, it is possible to convert into efficient image data less in deterioration of image quality, or correct image in order to obtain image data of high quality.

When saving as image file, the format suited to the image data can be selected automatically, and efficient filing is realized.

Further, as soon as the document image data is input, the image processing application is selected and started automatically, so that the labor is saved.

Further, as other embodiments relating to the image processing apparatus, image forming apparatus, and image processing method of the present invention, fifth to twelfth embodiments are described specifically below while referring to the accompanying drawings.

<Fifth Embodiment>

Figure 15:
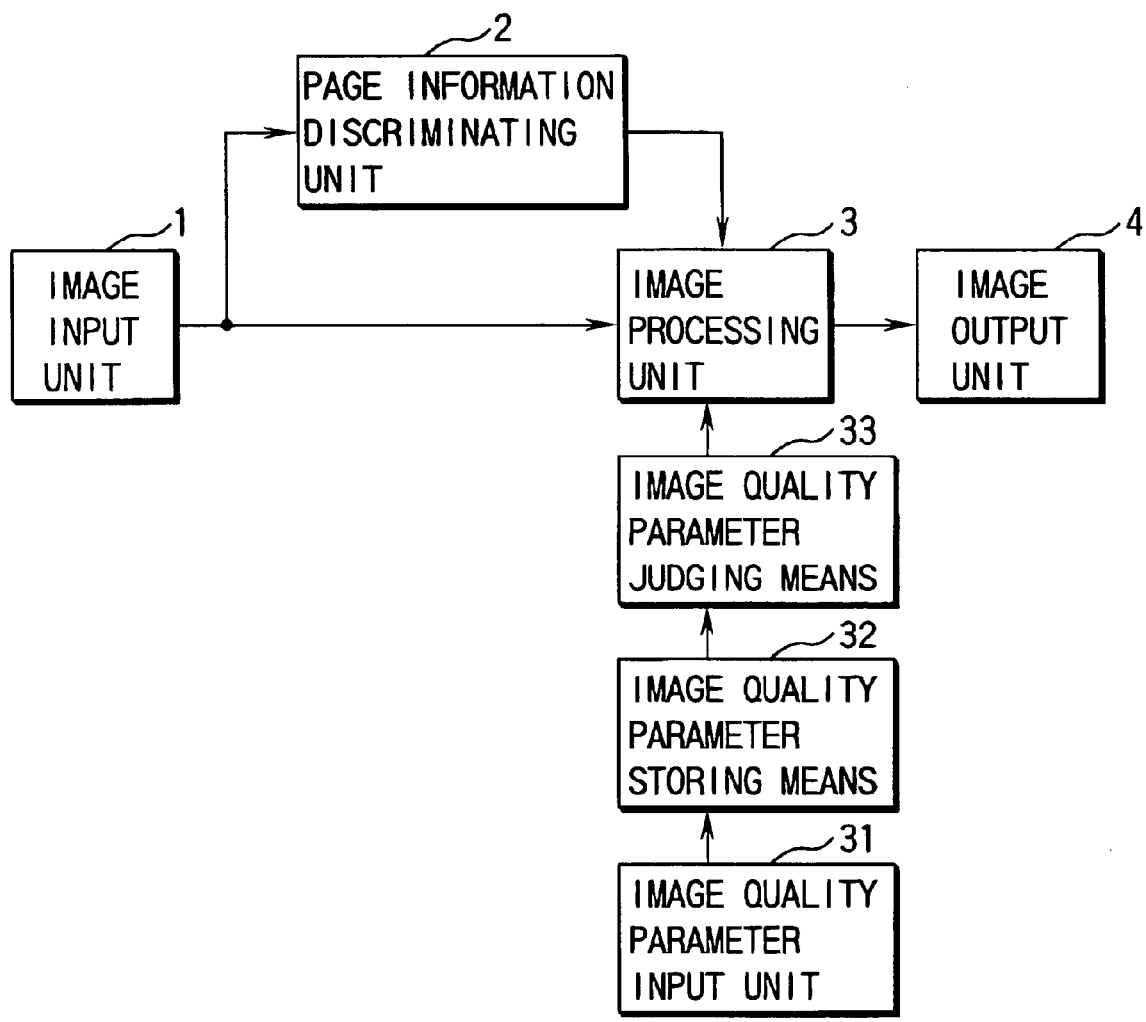
FIG. 15 is a block diagram showing a schematic constitution of an image forming apparatus in a fifth embodiment of the present invention.

A fifth embodiment is shown in FIG. 15, which presents an image forming apparatus for composing an image quality parameter as shown in FIG. 15, in addition to the first embodiment. An electronic copier usually comprises an image input unit such as scanner, an image processing unit, and an image forming unit such as printer. The electronic copier also includes an operation unit (control panel) to be used by the user for making various settings. The operation unit has an image quality parameter input unit as described later, and an image quality adjusting parameter is input according to the user's preference of image quality.

That is, in FIG. 15, the image forming apparatus comprises an image input unit 1, a page information discriminating unit 2, an image processing unit 3, and an image forming unit 4. The image forming apparatus is connected with an image parameter input unit 31 for inputting an image quality adjusting parameter according to the user's preference of image quality, an image quality storing unit 32 for storing the image quality parameter input by the image quality parameter input unit 31, and an image quality parameter deciding unit 33 for deciding the image quality parameter to be processed in the image processing unit 3 on the basis of the image quality parameter stored in the image quality parameter storing unit 32.

Referring to FIG. 15, the embodiment of the present invention is described in detail below.

First, the image input unit 1 is, for example, a color CCD scanner, which reads the original color image, and separates into electric signals of three primaries, R (red), G (green), B (blue), vertically and horizontally, converts into 8-bit digital data of each color in each unit pixel (for example, 400 dpi), and outputs as R, G, B, respectively.

Image signals of R, G, B are input into the page information discriminating unit 2 for discriminating the type of the entire image, and the image processing unit 3.

Figure 16:
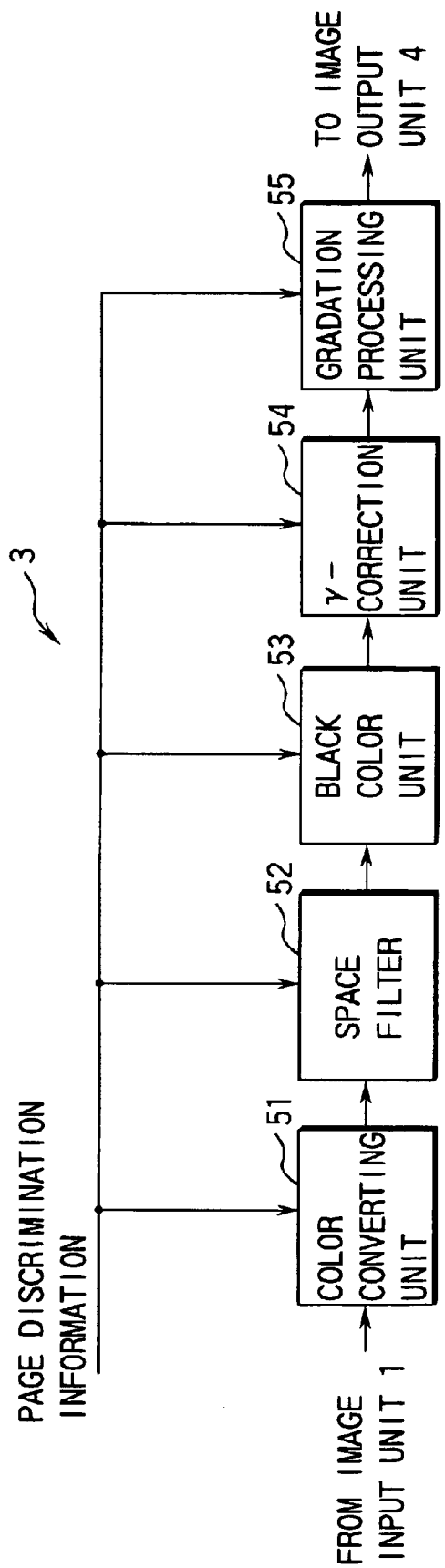
FIG. 16 is a diagram showing an example of constitution of image processing means.

FIG. 16 shows an example of the image processing unit 3, which is composed of a color converting unit 51, a space filter 52, a black color unit 53, a γ-correction unit 54, and a gradation processing unit 55, and in each block the page information output by the page information discriminating unit 2 is input together with the image signals output by all blocks.

In the color converting unit 51, signals of R, G, B input from the scanner are converted in the following formula 1, and signals of C (cyan), M (magenta), and Y (yellow) corresponding to the signals of the image forming unit 4 are obtained.

Dr=−log R
Dg=−log G
Db=−log B $$\begin{pmatrix} C \\ M \\ Y \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} Dr \\ Dg \\ Db \end{pmatrix}$$

Figure 17:
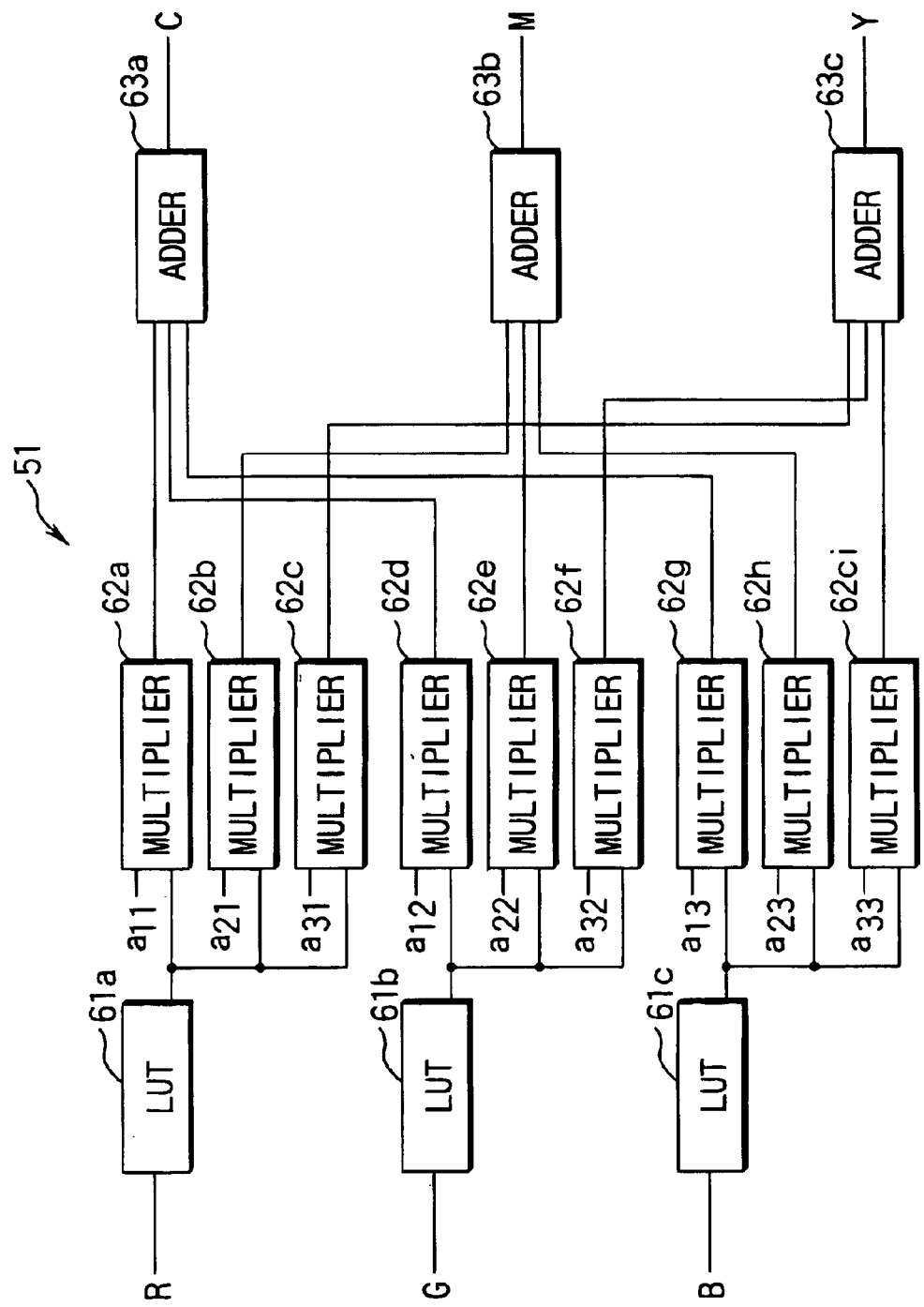
FIG. 17 is a diagram showing an example of circuit constitution of color converting means.

This operation is composed of the circuit shown in FIG. 17. The color converting unit 51 is composed of look-up tables (LUT) 61a to 61c for log conversion, nine multipliers 62a to 62i for 3×3 matrix operation, and three adders 63a to 63c.

In the color converting unit 51, the method of use of page discrimination signal is, for example, as follows. First, as the types of original image data mentioned in the first embodiment, or the types of individual documents (called page discrimination information hereinafter), uniform background (having characters), dot background (having characters), dot photo (having photo only), and continuous photo (having photo only) are defined. In these four types of images, generally, it is known that the blue color is strong in the case of continuous photo using photographic printing paper. It is therefore preferred to change the color reproducibility only in the case of continuous photo. To change the color reproducibility, it is necessary to change the coefficients all to a33 of the color conversion matrix. That is, preparing coefficients all to a33 for continuous photo, and coefficients all to a33 for other image, they are changed over on the basis of the page discrimination information.

Figures 18, 19:
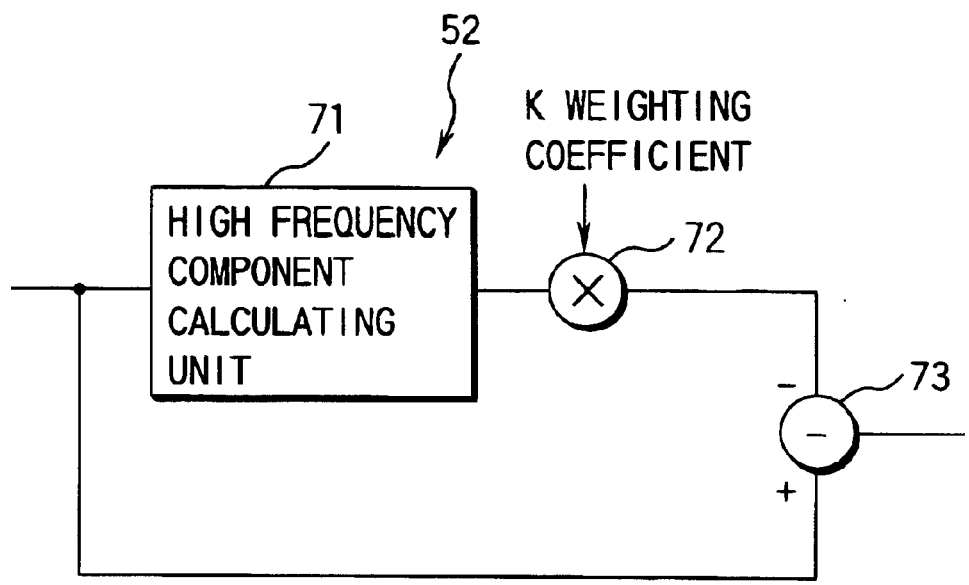
FIG. 18 is a diagram showing an example of circuit constitution of space filter means.
FIG. 19 is a diagram showing a filter constitution.

The space filter 52 is composed of, for example, a high frequency component calculating unit 71, a multiplier 72 for operating the weight of high frequency component, and s subtracting unit 73 of the original image as shown in FIG. 18. The high frequency component calculating unit 71 is to operate, for example, 3×3 Laplacian filter, and emphasize the high frequency component of the original image, and it is composed of a filter as shown in FIG. 19.

Figure 20:
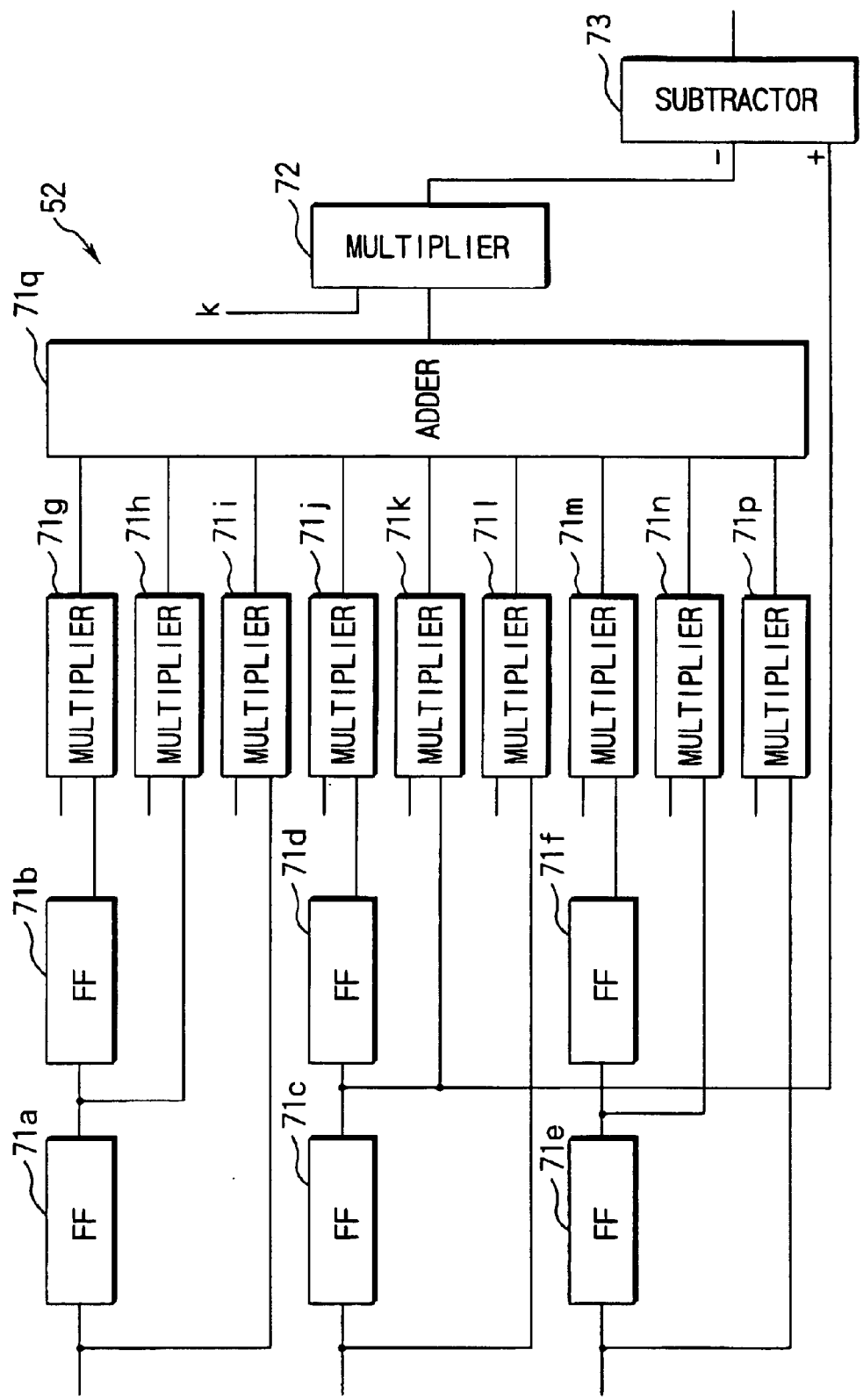
FIG. 20 is a diagram showing a specific example of circuit constitution of space filter means.

FIG. 20 shows a specific example of circuit constitution of the space filter 52, in which the high frequency component calculating unit 71 is composed of flip-flop circuits 71a to 71f, multipliers 71g to 71p, and adder 71q. This circuit is required for each color of C, M and Y. Herein, the weighting coefficient K is an image quality parameter determined by the image quality parameter deciding unit 33, and by adjusting this weighting coefficient K, the sharpness of image can be adjusted.

The method of using the page discrimination information in this space filter 52 is the method of changing the filter coefficient or weighting coefficient K on the basis of the page discrimination information shown in FIG. 19. For example, in the case of uniform background or continuous photo, the filter weighting coefficient K is large, and in the case of dot background or dot photo, the weighting coefficient K is set smaller in order to suppress dot moiré.

The black color unit 53 processes to generate signal of C (cyan), M (magenta), Y (yellow), and K (black) from the signals of C (cyan), M (magenta), and Y (yellow), and, for example, the UCR processing is done as shown in the formula below.

$$K = a \times mn(C, N, Y)$$

C'=C−K
M'=M−K
Y'=Y−K a: parameter for determining the amount of black color

Figure 21:
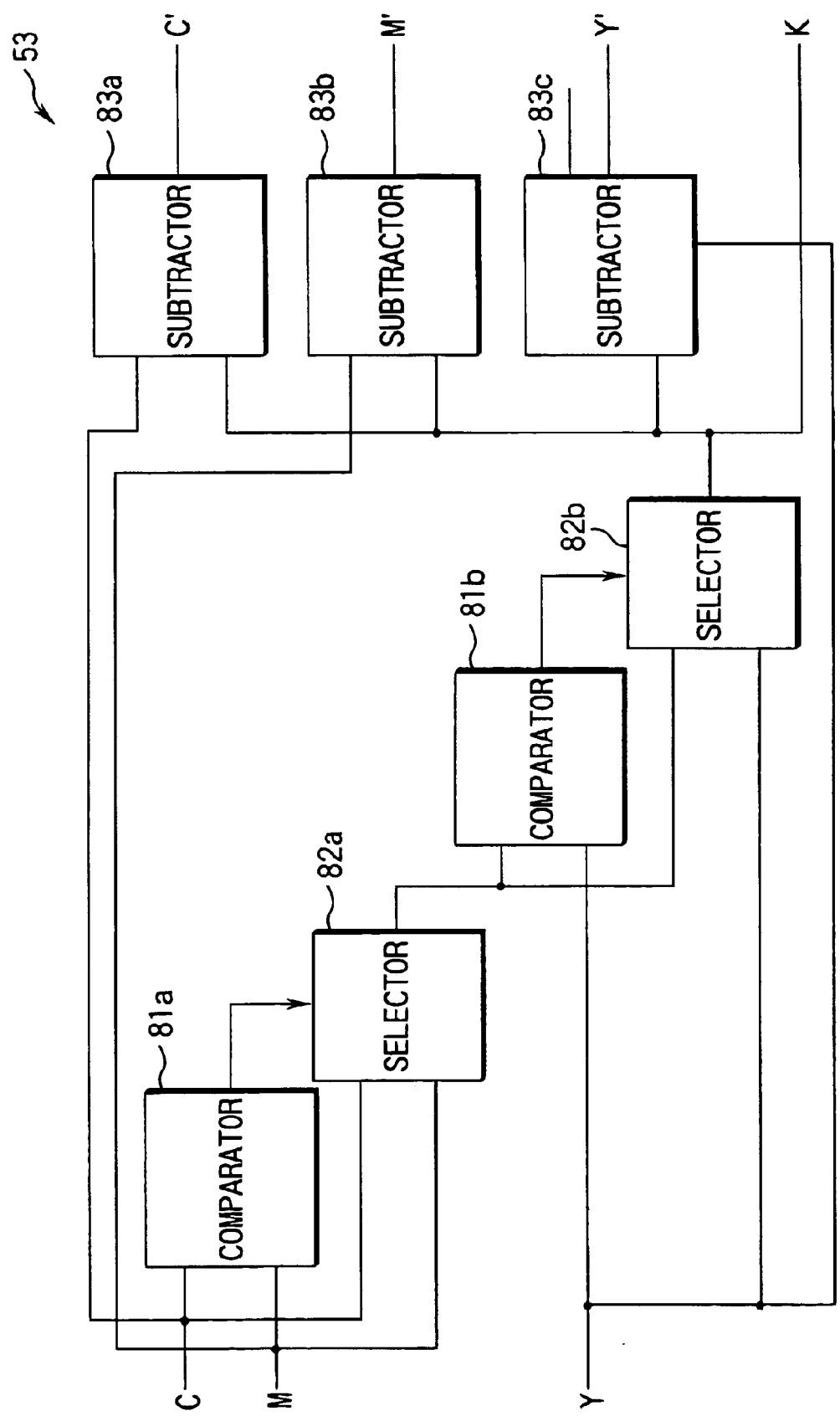
FIG. 21 is a diagram showing an example of circuit constitution of black printing means.

This operation is composed of, for example, the circuit shown in FIG. 21. This circuit is composed of comparators 81a, 81b, selectors 82a, 82b, and subtractors 83a to 83c.

The method of utilizing page discrimination in the black color unit 53 is, for example, a method of changing the black color rate (a) in every type of image. In the uniform background or dot background having characters, by setting the black color rate (a) higher, black characters are reproduced more easily in a single black color, and the character reproducibility is enhanced. In the case of dot photo or continuous photo, the color reproducibility is improved by setting the black color rate (a) lower.

Figure 22:
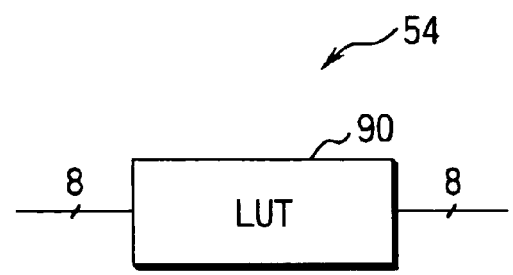
FIG. 22 is a diagram showing an example of constitution of γ-correcting means.
Figure 23:
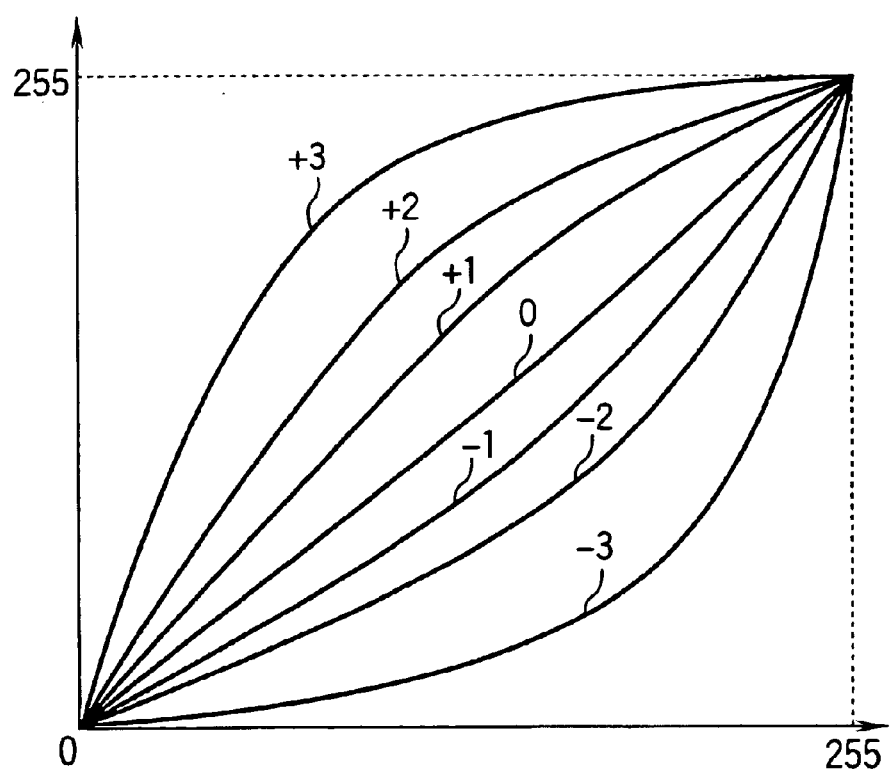
FIG. 23 is a diagram for explaining setting of density converting curve.

The γ-correction unit 54 is a block used for correcting the density characteristic of the printer unit of each color of C, M, Y, and adjusting the density by the user, and a simplest constitution is a look-up table (LUT) 90 of input of 8 bits and output of 8 bits as shown in FIG. 22. In this table, for example, a density conversion curve as shown in FIG. 23 is set. The default is, for example, a curve of 0 (a curve equal in input and output), and when the user adjusts the density, a density curve corresponding to −3 to +3 is selected and set according to the determined image quality parameter.

In the γ-correction unit 54, the following setting method using page discrimination information is available. For example, in the case of uniform background or dot background having characters, as the γ-curve used as γ-correction, a high-γ table is prepared and set. As a result, the reproducibility of characters is enhanced. On the other hand, in the case of dot photo or continuous photo, a table of linear input and output is set for improving the gradation reproducibility.

The gradation processing unit 55 is to process to convert 8-bit signal of C, M, Y, K into, for example, 1 bit (binary), and the error diffusion method is known as a representative method.

Figure 24:
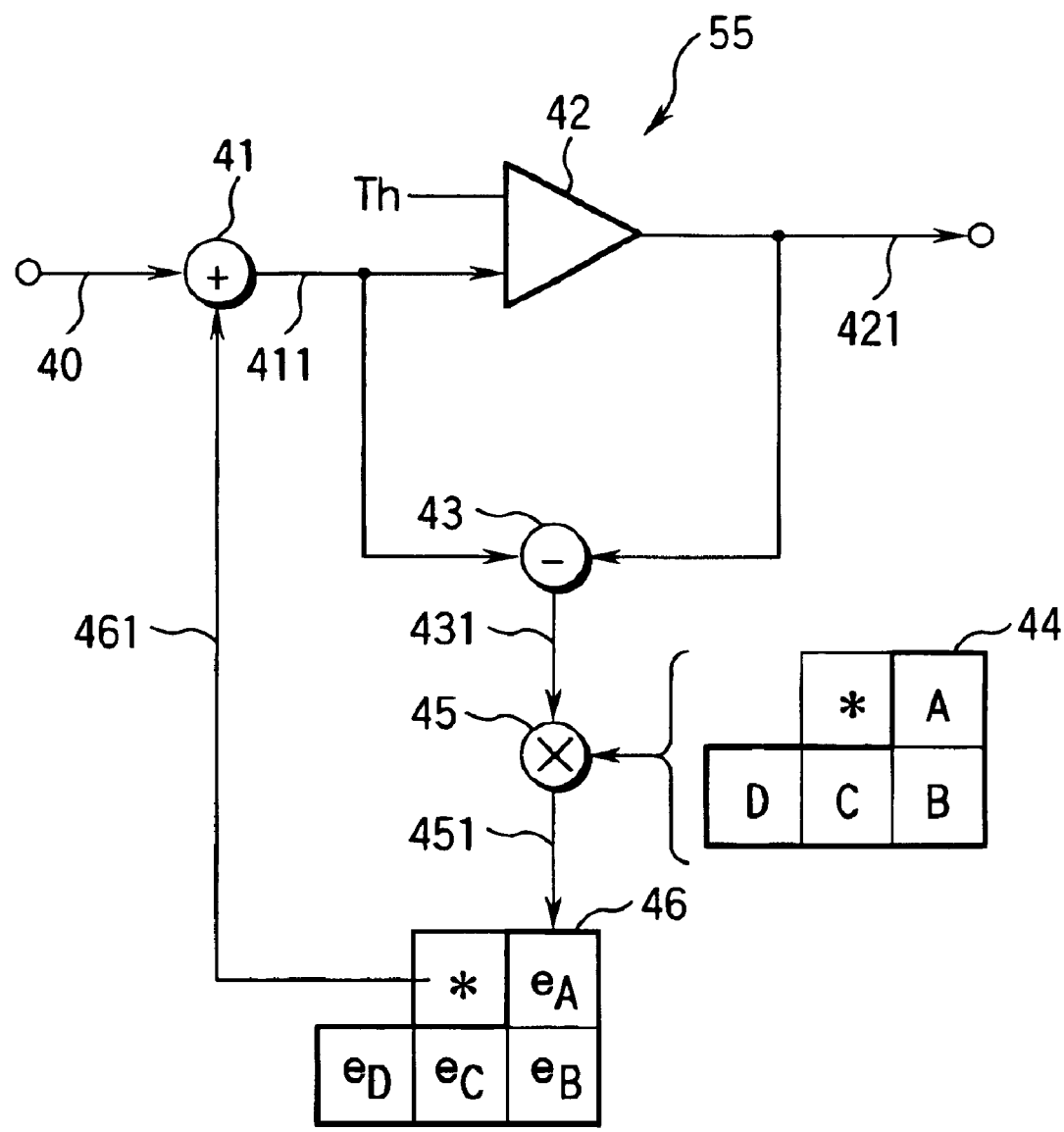
FIG. 24 is a diagram showing constitution of binary processing by error diffusion method.

In the error diffusion method, a binary error of an already binary peripheral pixel is multiplied by a certain weighting coefficient, and this product is added to the density of the pixel of notice, and a binary value is obtained by fixed threshold. FIG. 24 is a structural block diagram of binary process by error diffusion method. In FIG. 24, the binary circuit includes an input image signal 40, a correcting unit 41 for correcting image information of pixel of notice, a corrected image signal 411, a binary unit 42 for obtaining a binary value from the corrected image information of pixel of notice, a binary image signal 421, a binary error calculating unit 43 for calculating the binary error of binary pixel of notice, a binary error signal 431, a weighting coefficient memory unit 44 for storing the weighting coefficient for calculating the weighting error, a weighting error calculating unit 45 for calculating a weighting error by multiplying the binary error calculated in the binary error calculating unit 43 by the weighting coefficient of the weighting error memory unit 44, a weighting error signal 451, an error memory unit 46 for storing the weighting error calculated in the weighting error calculating unit 45, and an image correction signal 461. The binary process of the error diffusion method is described in detail below.

The input image signal 40 of the γ-correction unit 55 is corrected by the image correction signal 461 described later, and a corrected image signal 411 is output. The corrected image signal 411 is compared with a binary threshold Th (for example, in 80 h, "h" denotes hexadecimal notation) in the binary unit 42, and when the corrected image signal 411 is larger than the binary threshold Th, "1" (black pixel) is output as binary image signal 421, and "0" (white pixel) is output when smaller. In the binary error calculating unit 43, the difference between the corrected image signal 411 and binary image signal 421 (herein, however, it is 0 h when binary image signal is "0", and ffh when "1") is calculated, and it is output as binary error signal 431. In the weighting error calculating unit 45, the binary error signal 431 is multiplied by the weighting coefficients A, B, C, D (A=7/16, B=1/16, C=5/16, D=3/16) of the weighting coefficient memory unit 44, and the weighting error 451 is calculated. Herein, the * mark in the weighting coefficient memory unit 44 indicates the position of pixel of notice, and the binary error of the pixel of notice is multiplied by the weighting coefficients A, B, C, D, and the weighting error of four peripheral pixels of the pixel of notice (pixels corresponding to the positions of the weighting coefficients A, B, C, D) is calculated. The error memory unit 46 is to store the weighting error 451 calculated in the weighting error calculating unit 45, and the weighting errors of four pixels calculated in the weighting error calculating unit are added and stored in the regions of eA, eB, eC, eD corresponding to the pixel of notice *. The image correction signal 461 is a signal at position of *, and is a cumulative signal of weighting errors of four pixels calculated in the above procedure.

In the above explanation of gradation processing unit 55, the output is binary, but by preparing a plurality of binary thresholds Th and comparing with the input image signal, multi-value processing is same as in binary value.

In the gradation processing unit 55, for example, the page discrimination information is utilized as described below. First, FIGS. 25A and 25B show two cases of output of the gradation processing unit 55.

Figure 25A:
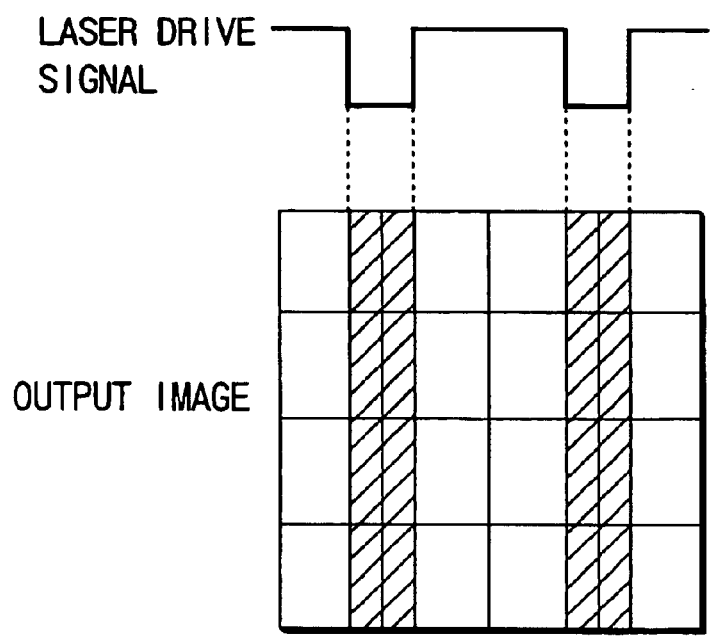
FIGS. 25A, 25B are diagrams for explaining gradation processing means.

In FIG. 25A, the laser modulator, not shown, of the image forming unit 4 is modulated in the unit of two pixels, and as determined from the diagram, the resolution is ½, but since the pixel size is small even at the same gradation level, the gradation output withstands fluctuation of recording, and an image can be formed on the basis of a stable output.

Figure 25B:
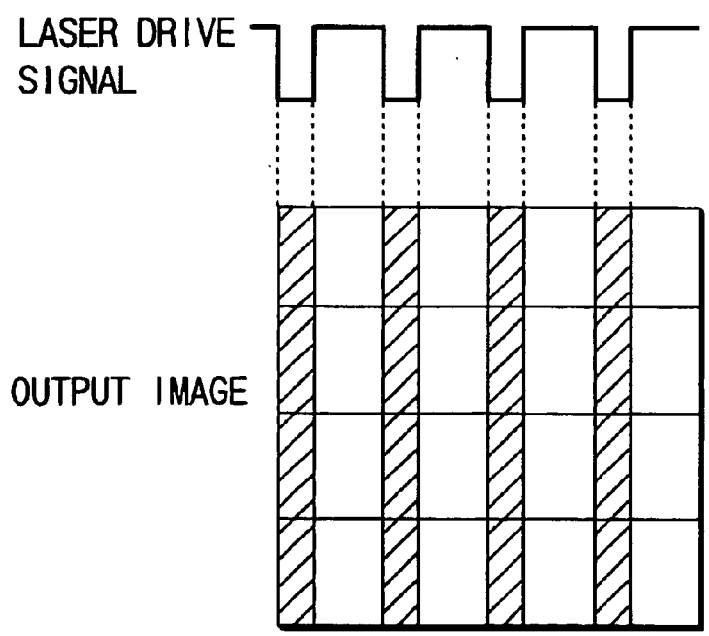

In FIG. 25B, on the other hand, the laser is driven in the unit of one pixel, and the resolution is high although stability of density fluctuation is insufficient. That is, the one-pixel modulation method of high resolution is employed in the case of uniform background or dot background having characters, and the two-pixel modulation method of high density stability is employed in the case of dot photo or continuous photo.

Examples of use of page discrimination information in each process are presented herein, but the method of use is not limited to these examples alone, but various methods may be considered.

So far is shown an example of structure of the image processing unit 3, and thus processed signals of C (cyan), M (magenta), Y (yellow), and K (black) are input in the image forming unit 4, and an image is formed and output on a paper.

In such constitution, an embodiment of the page information discriminating unit 2 in the fifth embodiment operating same as in the first embodiment is described below.

Figure 26:
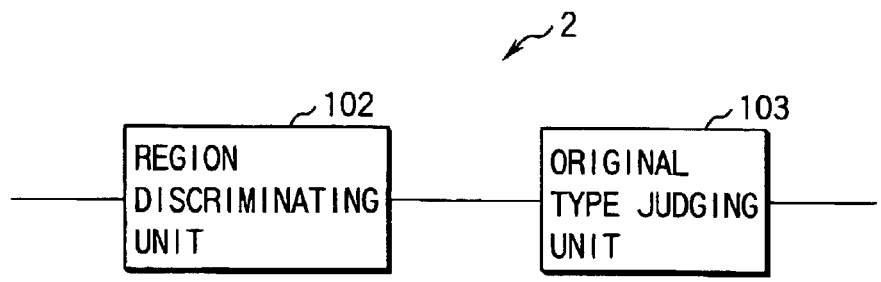
FIG. 26 is a diagram showing an example of constitution of page information discriminating means.

FIG. 26 shows an example of structure of the page information discriminating unit 2. The page information discriminating unit 2 is composed of region discriminating unit 102 and original type determining unit 103 shown in FIG. 1.

The page information discriminating means 2 takes in a document image, in the region discriminating means 21, one coupled physically or logically from the situation of each pixel and vicinal pixel data is extracted as one region, feature quantities of each region such as position on the image, size, shape, structure, and density distribution are measured, and the result of measurement is discriminated as the region having attribute such as character, photograph, and dot as the document constituent elements according to a preset rule. On the basis of the attribute information and others, in the original type determining unit 103, the type of the document is decided from the features of the entire input document image, and the image data format can be converted according to the type of the document.

The structure and operation of the region discriminating unit 102 and original type determining unit 103 are same as in the first embodiment shown in FIG. 1 and after, and their description is omitted herein.

<Sixth Embodiment>

Figure 27:
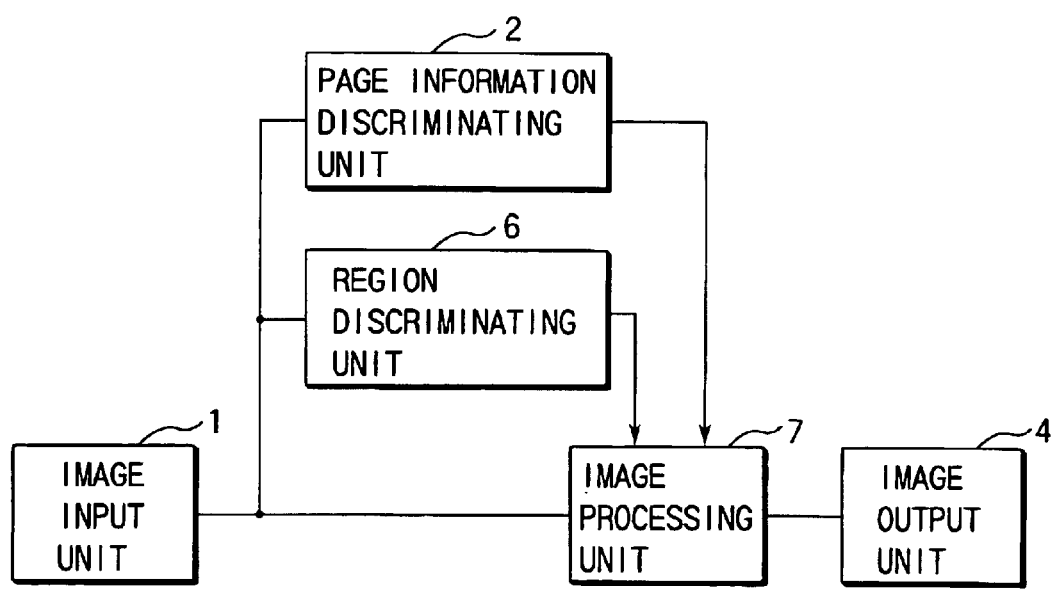
FIG. 27 is a diagram showing an example of constitution of image forming apparatus when using page discriminating information and rectangle discriminating information according to a sixth embodiment.

The foregoing description relates to an example of using the page discrimination information only when determining the processing conditions in each process of the image processing unit, but in a sixth embodiment shown in FIG. 27, rectangle discrimination information (image type of plural regions) is used together with the page discrimination information.

In FIG. 27, the page discrimination information and rectangle discrimination information are used as the processing conditions in each process of the image processing unit. As compared with the constitution in FIG. 15, a region discriminating unit 6 is added, and together with the page discrimination information output by the page information discriminating unit 2, the rectangle discrimination information output by the region discriminating unit 6 is input into the image processing unit 7. By using both page discrimination information and rectangle discrimination information, more specific parameter setting is possible in the image processing unit 7.

For example, the page discrimination information is the information shown in FIG. 28A. Herein, "0. Region discrimination" shows that the rectangle discrimination information output by type region discriminating unit 6 is valid, and "1. Uniform background to 4. Continuous photo" means that the page discrimination information output by the page information discriminating unit 2 is valid.

When the page discrimination information is "0. Region discrimination," using the discrimination result of the rectangle unit of the region discriminating unit 3, the image processing condition is changed in the rectangle unit in the image processing unit 3. On the other hand, when the page discrimination information is "1. Uniform background to 4. Continuous photo," this information is used as the discrimination information in the page unit, and the image processing unit 4 sets the image processing condition on the basis of this information, and executes a specific processing in the image unit. Thus, by using the page discrimination information, as compared with the conventional image copying apparatus generally having five operation modes shown in FIG. 28B as the operation modes (operation modes corresponding to the type of the original to be copied), an automatic mode can be provided as shown in FIG. 28C (the mode for selecting a mode for executing specific process image unit and a mode for executing the process by changing the processing condition in the unit of rectangle or pixel, automatically on the basis of the page discrimination information and outputting), so that an image of a higher image quality than in character/photo mode can be obtained.

When the page discrimination information is "5. Indiscriminative," it means all of "0. Region discrimination to 4. Continuous photo" are invalid, and none of the discrimination information can be used. Therefore, in the image processing unit 7, specific processing is done in the entire image without using discrimination information, or the type of image discriminated in the pixel unit in a method explained below, and the image is processed.

<Seventh Embodiment>

Figure 29:
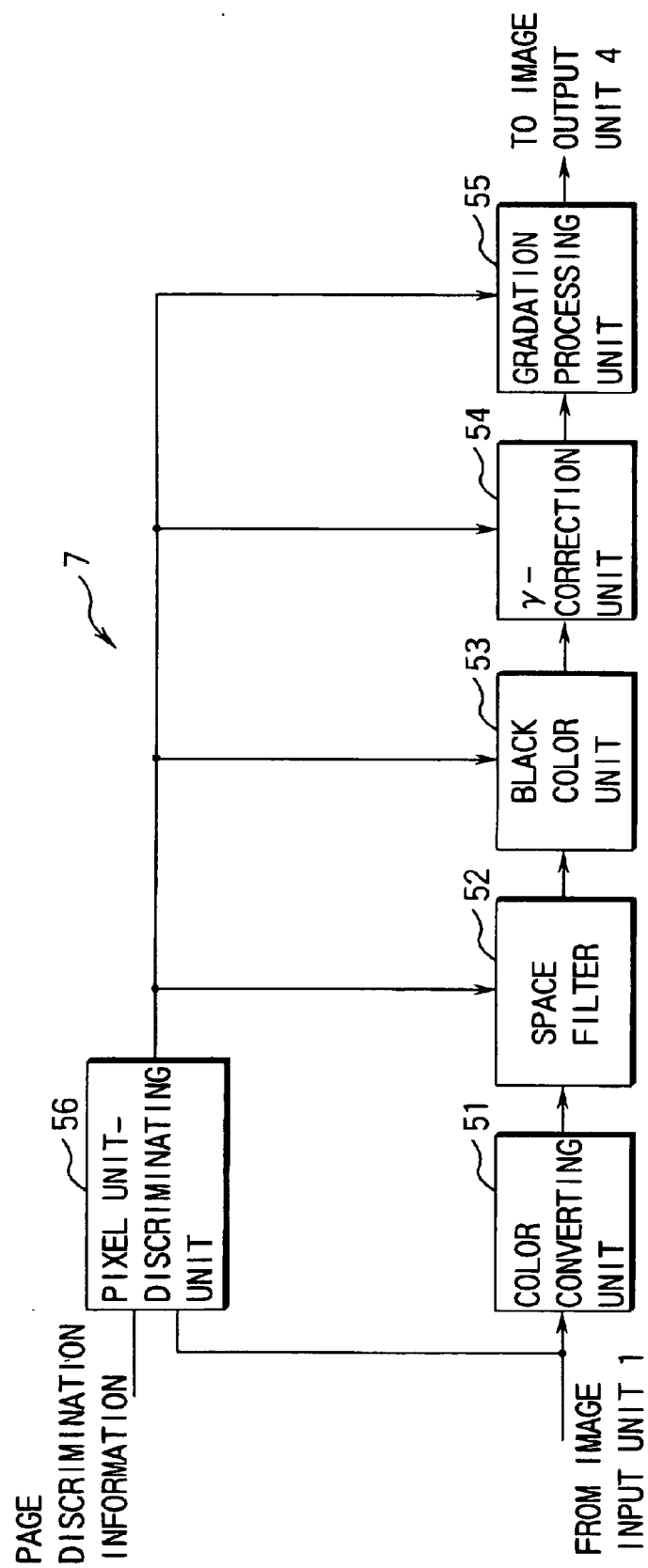
FIG. 29 is a diagram showing an example of constitution of image processing means for executing image processing by discriminating in pixel unit according to a seventh embodiment.

A seventh embodiment is shown in FIG. 29, in which the discrimination process in pixel unit is further added to the first embodiment. FIG. 29 shows an example of structure of an image processing unit 7 when executing image processing by discriminating in the pixel unit.

The image processing unit 7 shown in FIG. 29 is similar to the image processing unit 3 for inputting page discrimination information shown in FIG. 16, except that a pixel unit discriminating unit 56 is added. In the constitution in FIG. 16, specific page discrimination information for entire image is input in the color converting unit 51 to gradation processing unit 55, and each image processing is determined in the image processing condition on the basis of its page discrimination information. In the constitution of the image processing unit 7 in FIG. 29, instead of the page discrimination information, the pixel unit discriminating unit 56 discriminates the type of image in the pixel unit on the basis of the input image information, and processes by setting the image processing condition in each image processing block on the basis of this discrimination information.

The processing method in the pixel unit discriminating unit 56 includes, for example, a method of separating three regions of character, photo, and dot photo, as disclosed in "Block Separate Transformation Method (BSET)" in "Discrimination Processing Method of Dot Photograph" (J. of Japan Society of Electronics, Information Communication, Vol. J70-B, No. 2, February 1987).

In this method, the object image is divided into blocks, and three regions are separated by density change within blocks. At this time, it is intended to make use of nature of density changes, that is:

Photograph is small in density change in block.

Character and dot photograph are large in density change in block.

Character is large in period of density change.

Dot photograph is small in period of density change.

The detail is described below.

(1) The object image is divided into blocks of (m×n) pixels.

(2) Maximum density signal Dmas and minimum density signal Dmin in block are determined, and maximum density difference signal ΔDmax in block is calculated.

(3) Comparing preset threshold Th1 and ΔDmax, photo region and non-photo resin (character and dot photo region) are separated in the following condition.

$\Delta Dmax \leq Th1$ Photo region $\Delta dmax > Th1$ Non-photo region (4) Each pixel in block is coded into binary signal (0/1) by average signal Da of signal in block.

(5) The number of times of 0/1 change Kh between pixels consecutive in the main running direction in block is determined. Similarly, in the sub-scanning direction, the number of times of changes Kv is determined.

(6) Comparing preset threshold Th2 and Kh and Kv, the character region and dot photo region are separated in the following condition.

Kh≧Th2 and Kv≧Th2 Dot photo region

Kh<Th2 and Kv<Th2 Character region

In this procedure, the character, photo, and dot photo regions can be separated.

Figure 30:
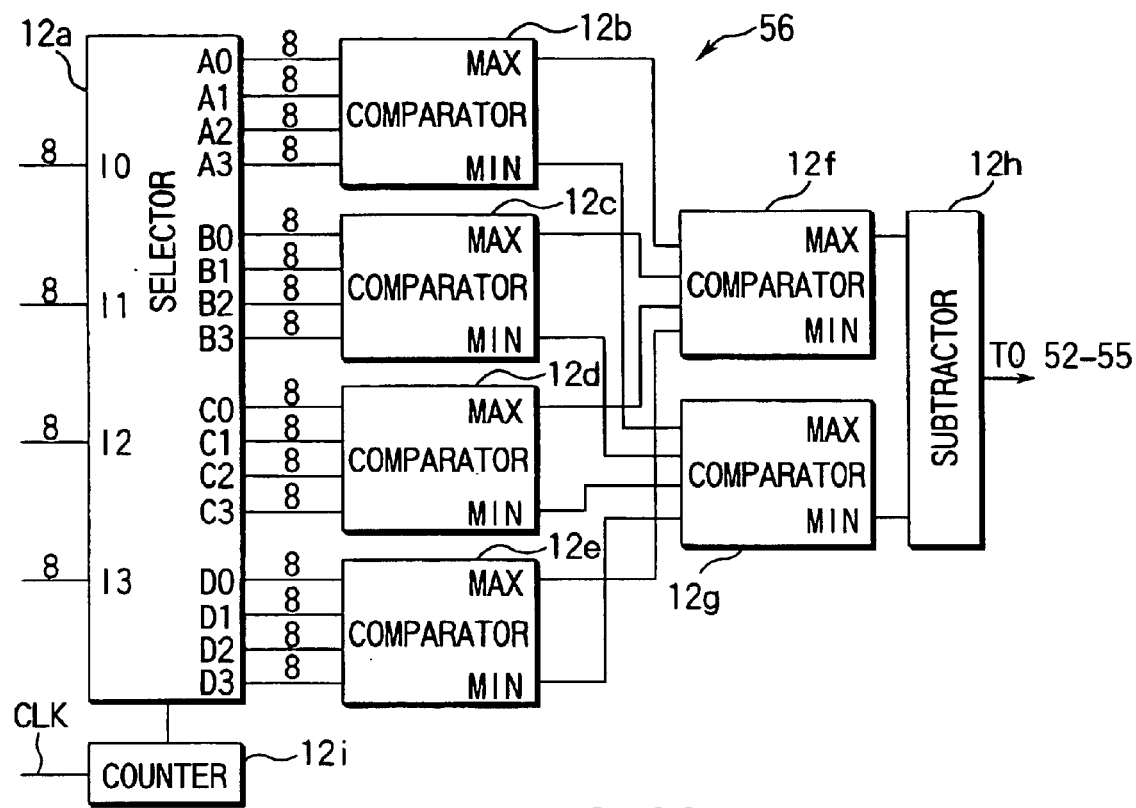
FIG. 30 is a diagram showing an example of circuit constitution of pixel unit discriminating means.
Figure 31:
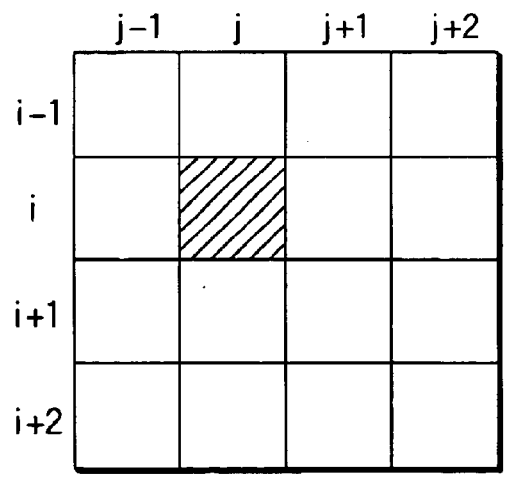
FIG. 31 is a diagram for explaining a window of 4×4.

FIG. 30 shows an example of circuit configuration of pixel unit discriminating unit 56, which is a circuit for calculating the maximum density difference ΔDmax in 4×4 window (shaded areas showing pixel of notice) shown in FIG. 31. This circuit is composed of selector 12a, comparators 12b to 12g, and subtractor 12h.

<Eighth Embodiment>

Figure 32:
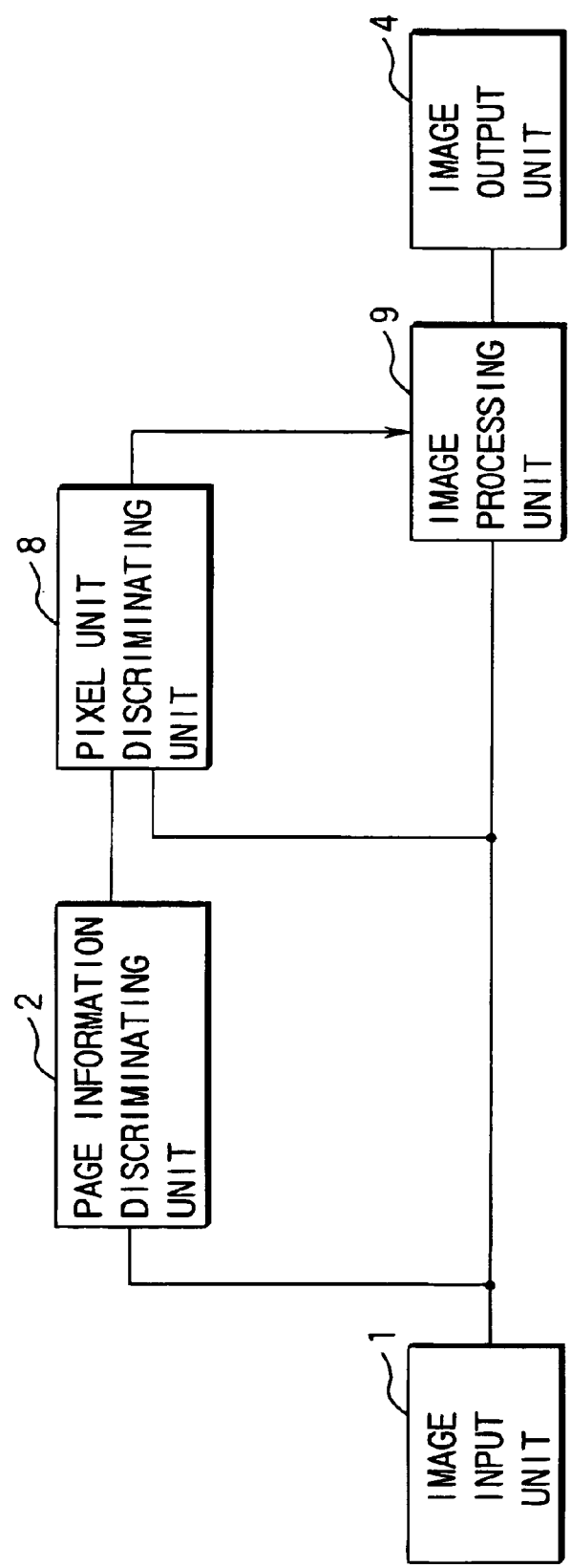
FIG. 32 is a diagram showing an example of constitution of image forming apparatus when using page discriminating information by pixel unit discriminating means according to an eighth embodiment.

An eighth embodiment is shown in FIG. 32, in which a case of setting the processing condition of pixel unit discriminating unit 56 by using page discrimination information is explained, and this is an effective method for enhancing the precision of discrimination.

FIG. 32 shows a constitution of using page discrimination information in the pixel unit discriminating unit 8. The operation of the page information discriminating unit 2 is as explained already, and the pixel unit discriminating unit 8 receives the page discrimination information together with the input image data of the image input unit 1, and sets a parameter for discrimination on the basis of the page discrimination information.

First, as page discrimination information, four pieces of information shown in FIG. 28D are output, and a discriminating method of pixel unit is explained in a case of discriminating the character region by using the maximum density difference ΔDmax. When using the maximum density difference ΔDmax, it is known that separation into dot region and character region is difficult. Therefore, using page discrimination information, it is set at threshold Th=th1 in the uniform background region, at Th=th2 in the dot photo region, and Th=th3 in the dot photo and continuous photo region (where th1>th2>th3=0). By thus setting, the photo region is not falsely discriminated as character region, and characters in the dot background region which are difficult to discriminate can be lowered in the rate of false discrimination in the non-character region, so that very effective pixel unit discrimination may be realized.

<Ninth Embodiment>

A ninth embodiment is shown in FIGS. 28A and 29, in which the duration of time necessary for discriminating process is evaluated by using "Time over" prepared as page discrimination information, and it is decided whether or not to use the page discrimination information according to the result. Thus, the certainty of region recognition can be attained as far as possible in the range of processing time.

That is, in FIG. 28A, "6. Time over" is provided as page discrimination information. The original type discriminating unit 22 shown in FIG. 26 is more preferably realized by the software, and therefore the processing time differs depending on the type of the original to be input. Therefore, the discriminating process may not be terminated within the required processing time of the image forming apparatus. This page discrimination information "6. Time over" is, by measuring the time required for discriminating process, set when it is not terminated within the processing time specified in this system. In such a case, the image processing unit 7 discriminates in the pixel unit without using page discrimination information as explained already in, for example, FIG. 29, and processes the images according to this discrimination information, thereby finishing within the preset range of processing time.

<Tenth Embodiment>

Figure 33:
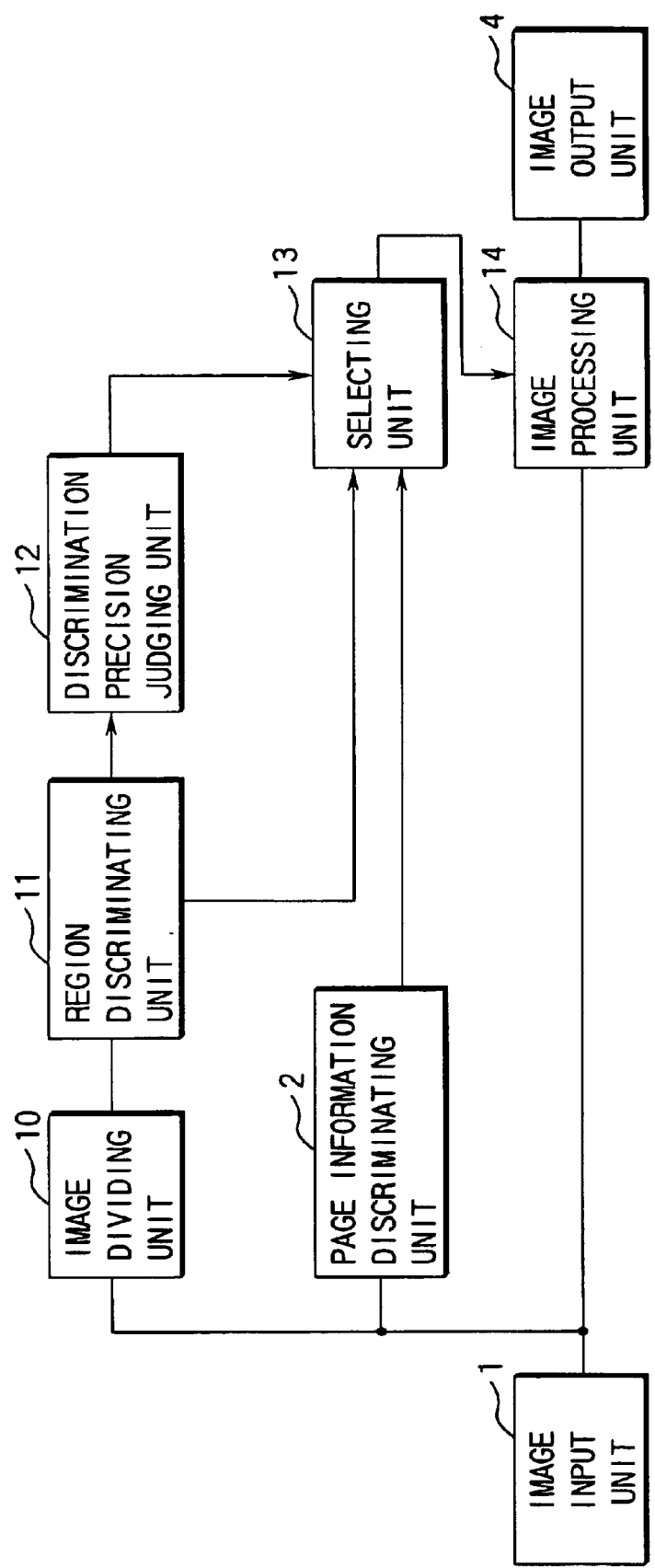
FIG. 33 is a diagram showing an example of constitution of image forming apparatus when becoming impossible to discriminate according to a tenth embodiment.

A tenth embodiment is shown in FIG. 33, and using "Indiscriminative" prepared as page information similarly, it is designed to evaluate the discrimination precision of discriminating process, and execute discriminating process appropriately according to it.

That is, the original type discriminating unit 22 outputs information such as "5. Indiscriminative" as shown in FIG. 28A. It corresponds to the flow of discriminating process at step ST403 in FIG. 4.

FIG. 33 shows a constitution of this embodiment.

The image forming apparatus in FIG. 33 comprises an image input unit 1, a page information discriminating unit 2, an image dividing unit 10, a region discriminating unit 11, a discrimination precision determining unit 12, a selecting unit 13, an image processing unit 14, and an image forming unit 4.

In this constitution, when the discrimination precision is poor, it is determined to be indiscriminative, and in such a case, therefore, the image processing unit 14 or 19 discriminates the pixel unit without using page discrimination information as explained already, for example, in FIG. 29, and it is possible to process images on the basis of this discrimination information. In this way, effects of poor discrimination result of discrimination precision can be avoided, and processing result of a specific level may be maintained.

<Eleventh Embodiment>

Figure 34:
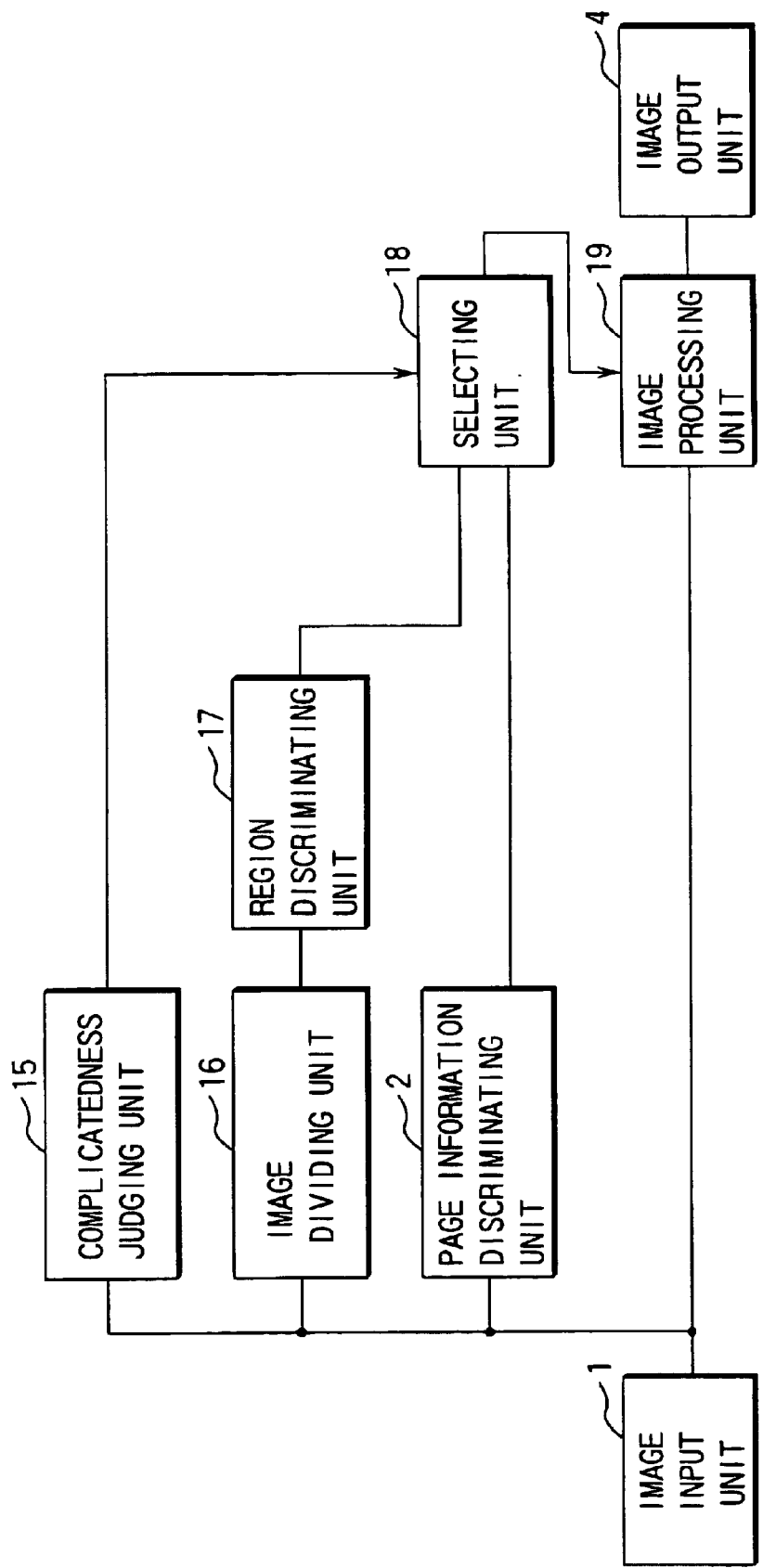
FIG. 34 is a diagram showing an example of constitution of image forming apparatus when becoming impossible to discriminate according to an eleventh embodiment.

An eleventh embodiment is shown in FIG. 34, and using "Indiscriminative" prepared as page information similarly, it is designed to evaluate the complicatedness of discriminating process, and execute discriminating process appropriately according to it.

FIG. 34 shows a constitution of this embodiment.

The image forming apparatus in FIG. 34 comprises an image input unit 1, a page information discriminating unit 2, a complicatedness determining unit 15, an image dividing unit 16, a region discriminating unit 17, a selecting unit 18, an image processing unit 19, and an image forming unit 4.

In this constitution, when the complicatedness of the object image is very high, it is determined to be indiscriminative, and in such a case, therefore, the image processing unit 14 or 19 discriminates the pixel unit without using page discrimination information as explained already, for example, in FIG. 29, and it is possible to process images on the basis of this discrimination information. In this way, adverse effects of discrimination result when the complicatedness is high can be avoided, and processing result of a specific level may be maintained.

Figure 35:
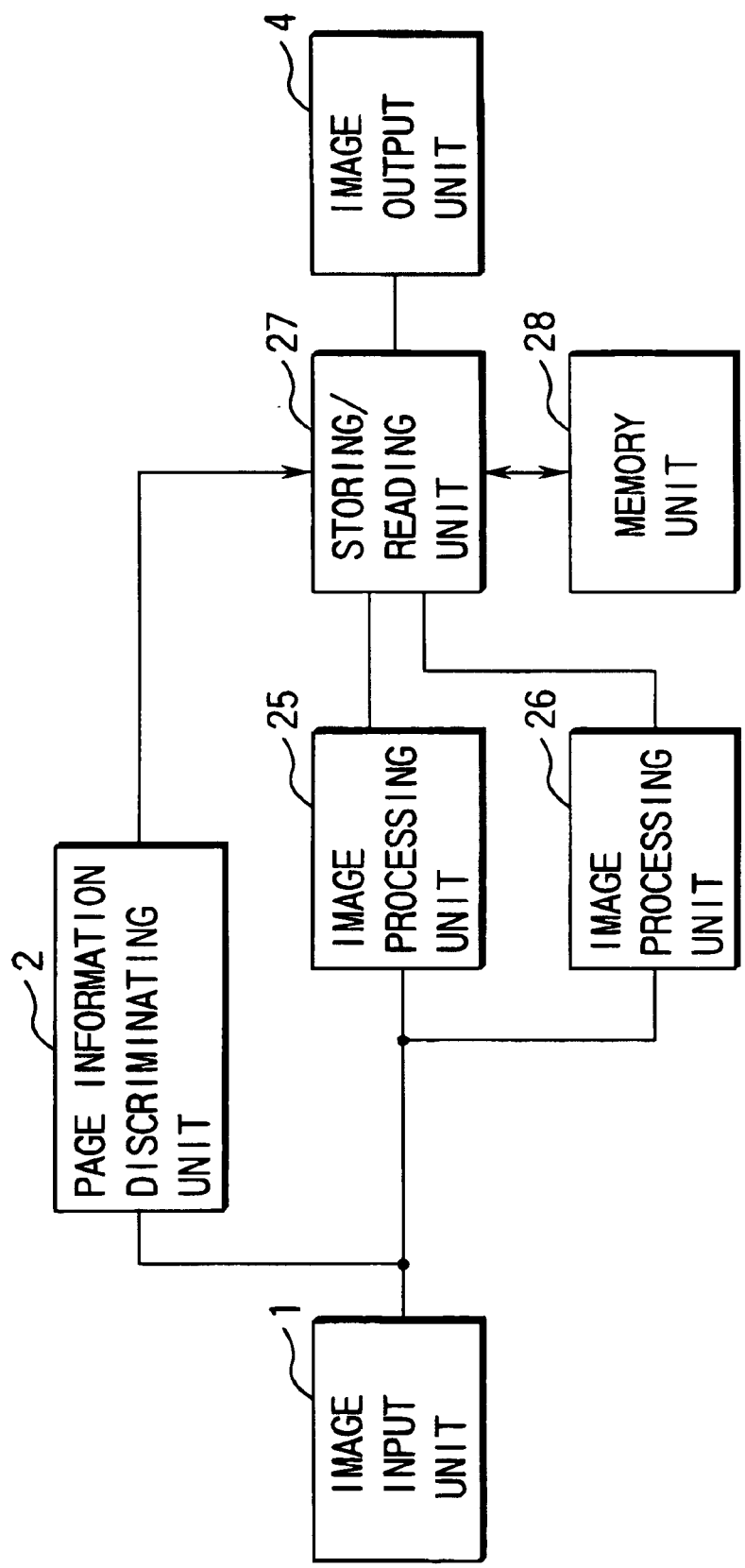
FIG. 35 is a diagram showing other example of constitution of image forming apparatus when using page discriminating information according to a twelfth embodiment.

The foregoing embodiments are representative methods using the page discrimination information, and a further different embodiment is shown in FIG. 35.

<Twelfth Embodiment>

A twelfth embodiment is shown in FIG. 35, in which the image is processed preliminarily by plural types of image processing conditions depending on the image information, if obtained without waiting for output of the discrimination result of page information in order to increase the processing speed, it is stored in the memory region, and when the discrimination result is obtained, the result of image processing corresponding to it is read out from the memory region. Thus, by parallel operation of discriminating process of image type and image processing of plural types, the processing speed can be increased on the whole.

The image forming apparatus in FIG. 35 comprises an image input unit 1, a page information discriminating unit 2, image processing units 25, 26, a storing/reading unit 27, a memory unit 28, and an image forming unit 4. This constitution has two image processing units 25, 26, and memory unit 28 for saving the processing results output by the image processing units 25, 26, and it is designed to output the image by selecting and reading from the stored plural image processing results by the page information discriminating unit 2.

In the image processing unit 25 and image processing unit 26, it is designed to process by two kinds of image processing conditions regardless of the page discrimination information, for example, the image processing parameter suited to character image and image processing parameter suited to photo image. The two kinds of image processing results are stored in the memory unit 28, for example, memory or HDD, and when the processing result output by the page information memory unit 2 is uniform background or dot background, the image processing result for character processed by the image processing unit 25 is read out from the storing/reading unit 27, and on the other hand, when the page information output by the page information discriminating unit 2 is dot photo or continuous photo, the image processing result for photo processed by the image processing unit 26 is read out from the memory unit 28 and output.

In such constitution, it is possible to operate processing of the page information discriminating unit 2 and processing of the image processing units 25, 26 parallel (that is, image processing is done in the image processing units 25, 26 without waiting for output of the page information discriminating unit 2), so that high speed operation is possible in the image forming apparatus.

As explained already, the image processing unit 3 shown in FIG. 15 makes use of the page discrimination information used in each image processing shown in FIG. 16, and the relation between the original mode showing the operation mode of the apparatus and the processing condition of page discrimination information and each image processing block is shown in FIG. 36.

In FIG. 36, the page discrimination result shows the page discrimination information shown in FIG. 28A, such as character/photo, character, map, printed photo, and photo in photographic printing paper shows the processing condition of each image processing such as color conversion, background processing, . . . , gradation processing, and it means the same condition as when each is selected as the original mode. The processing condition of each image processing for the same page discrimination information is not always the same, and symbols such as A, B, . . . denote variations of parameters slightly different from the case when selected as original mode, and it is necessary to divide into proper groups or into further small divisions depending on the image processing.

As explained herein, according to the embodiments of the present invention, if character and photograph are mixed, the character/photo mode is selected as the original mode, and the region or entire image is automatically discriminated as one category, and the image processing is done so as to obtain the optimum image quality.

Further, in discrimination done by the apparatus in the character/photo mode, not only the discrimination of the region but also discrimination information of entire image are output, and therefore the recognition precision can be enhanced, so that deterioration of image quality due to wrong recognition of type of image can be suppressed.

Further, to decrease the problems of such wrong recognition, such process as to decrease the difference in processing between categories to be discriminated (for example, character and photo) and make the deterioration of image quality due to wrong recognition less obvious even when discriminated falsely, and an output of higher image quality can be obtained as compared with the prior art.

As described specifically herein, the present invention presents an image processing apparatus capable of suppressing deterioration of image quality due to wrong discrimination in region discrimination, and an image forming apparatus and an image processing method capable of forming an image at high quality by processing appropriately depending on the type of the image data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   input means for inputting image data of an original image;
   discriminating means for extracting a predetermined region by using a feature of pixel of the image data input from the input means, and for discriminating an attribute of the region;
   determining means for, on the basis of the distribution of the regions attributes of which are discriminated by the discriminating means, determining whether or not the type of the image data is a rectangular discriminative region; and
   conversion means for performing image conversion when the determining means determines that the predetermined region extracted by the discriminating means is the rectangular discriminative region, said conversion means converting the image to lower resolution or increasing a compression rate of the image where the attribute of the region discriminated by the discriminating means is one of a dot photo region and a continuous photo region, and converting multi-valued data of the image into binary data to reduce the quantity of information contained in each rectangular discriminative region when the attribute of the rectangular discriminative region is such that it contains only black characters.

2. An image processing apparatus according to claim 1, further comprising:
   correcting means for correcting the image data by performing at least one of density conversion and filter processing, depending on the type determined by the determining means.

3. An image processing apparatus according to claim 1, further comprising:
   changing means for changing the image format of the image data, depending on the type determined by the determining means.

4. An image processing apparatus according to claim 1, further comprising:
   processing means for selecting an application of image processing, depending on the type determined by the determining means, setting a parameter, and starting the application to perform image processing of the image data.

5. An image processing apparatus according to claim 1, further comprising:
   means for performing specified processing on the basis of the attribute of the region discriminated by the discriminating means, on the image data in every region, when the determining result by the determining means is the specified result.

6. An image processing apparatus according to claim 1, further comprising:
setting means for setting for pixel unit discriminating process on the basis of the determining result by the determining means;
wherein the discriminating means discriminates the image type of the image data received from the input means in pixel unit on the basis of the setting by the setting means, when the determining result by the determining means is the specified result.

7. An image processing apparatus according to claim 1, wherein the discriminating means discriminates the image type of the image data received from the input means in pixel unit, when the determining means determines that it takes more than a specified time for determining.

8. An image processing apparatus according to claim 1, wherein the discriminating means determines the discrimination precision of the discriminating, and when the discrimination precision is below a specific value, the discriminating means discriminates the image type of the image data received from the input means in pixel unit.

9. An image processing apparatus according to claim 1, wherein the discriminating means determines the complicatedness of the discriminating, and when the complicatedness is above a specific value, the discriminating means discriminates the image type of the image data received from the input means in pixel unit.

10. An image processing apparatus according to claim 1, further comprising:
storing means for receiving the image data from the input means, performing a first process on the image data parallel to the determining process of the determining means to obtain a first result, further performing a second process different from the first process to obtain a second result, and storing them in a memory region; and
means for reading out and outputting either one of the first result and second result from the storing means on the basis of the determining result of the determining means.

11. An image processing apparatus according to claim 1, further comprising:
second discriminating means for discriminating the structure of the background from the extracted region, and judging the type of the image data on the basis thereof.

12. An image processing apparatus according to claim 1, further comprising:
means for judging presence or absence of character from the distribution of attribute in each region discriminated by the discriminating means, and judging the type of the image data on the basis thereof.

13. An image processing apparatus according to claim 1, further comprising:
judging means for judging the type of the image data on the basis of the distribution of the attribute in each region discriminated by the discriminating means; and
processing means for processing the data as specified on the basis of the image data judged by the judging means.

14. An image processing apparatus according to claim 1, further comprising:
second discriminating means for discriminating the page information which is the image type of each page of the original image of the image data when the discriminating means cannot divide the image data into a plurality of rectangular regions, and determining the type of the image data on the basis thereof.

15. An image processing apparatus according to claim 1, further comprising:
second discriminating means for discriminating the page information which is the image type of each page of the original image of the image data when the region extracted by the discriminating means has a complicatedness more than a specific value, and determining the type of the image data on the basis thereof.

16. An image processing apparatus according to claim 1, further comprising:
judging means for judging the type of the image data, regardless of the content of the original mode given from the user, on the basis of the distribution of the attribute of each region discriminated by the discriminating means.

17. An image processing apparatus according to claim 1, wherein the discriminating means discriminates the image information of the image data received from the input means in the pixel unit according to the judging result when the judging result by the judging means is the specified result.

18. An image processing apparatus according to claim 1, wherein the determining means first determines whether or not the image data is image data of uniform background, and if not, the determining means then determines if the image data is image data of dot background, and if not, the determining mans then determines if the image data is image data of dot photo only or of continuous gradation photo only, and if not, the determining means then determines if the image data is image data which can be discriminated as a rectangular region.

19. An image processing method comprising:
inputting step of inputting image data of an original image;
first discriminating step of extracting a predetermined region by using a feature of pixel of the image data input at the input step, and for discriminating an attribute of the region;
determining step of determining, based on the distribution of the regions attributes, whether or not the type of the image data is a rectangular discriminative region;
a conversion step for performing image conversion when the determining step determines that the predetermined region extracted by the discriminating step is the rectangular discriminative region, the conversion step converting the image to lower resolution or increasing a compression rate of the image where the attribute of the region discriminated by the discriminating step is one of a dot photo region and a continuous photo region, and converting multi-valued data of the image into binary data to reduce the quantity of information contained in each rectangular discriminative region when the attribute of the rectangular discriminative region is such that it contains only black characters.

20. An image processing method according to claim 19, further comprising:
correcting step of correcting the image data by performing at least one of density conversion and filter processing, depending on the type determined at the determining step.

21. An image processing method according to claim 19, further comprising:
changing step of changing the image format of the image data, depending on the type determined at the determining step.

22. An image processing method according to claim 19, further comprising:

processing step of selecting an application of image processing, depending on the type determined at the determining step, setting a parameter, and starting the application to perform image processing of the image data.

23. An image processing method according to claim 19, further comprising:

step of performing specified processing on the basis of the attribute of the region discriminated at the discriminating step, on the image data in every region, when the determining result at the determining step is a specified result.

24. An image processing method according to claim 19, further comprising:

setting step of setting for pixel unit discriminating process on the basis of the determining result at the determining step;

second discriminating step of discriminating the image type of the image data received from the input step in pixel unit on the basis of the setting at the setting step, when the determining result at the determining step is a specified result; and processing step of processing the image data as specified, on the basis of the result discriminated at the second discriminating step.

25. An image processing method according to claim 19, further comprising:

second discriminating step of discriminating the image type of the image data received from the input step in pixel unit, when it is determined that it takes more than a specified time for determining at the determining step; and processing step of processing the image data as specified, on the basis of the result discriminated at the second discriminating step.

26. An image processing method according to claim 19, further comprising:

second discriminating step of determining the discrimination precision at the discriminating step, and when the discrimination precision is below a specific value, discriminating the image type of the image data received from the input step in pixel unit; and processing step of processing the image data as specified, on the basis of the result discriminated at the second discriminating step.

27. An image processing method according to claim 19, further comprising:

second discriminating step of determining the complicatedness at the discriminating step, and when the complicatedness is above a specific value, discriminating the image type of the image data received from the input step in pixel unit; and processing step of processing the image data as specified, on the basis of the result discriminated at the second discriminating step.

28. An image processing method according to claim 19, further comprising:

storing step of receiving the image data from the input step, performing a first process on the image data parallel to the determining process at the determining step to obtain a first result, further performing a second process different from the first process to obtain a second result, and storing them in a memory region; and step of reading out and outputting either one of the first result and second result stored at the storing step on the basis of the determining result at the determining step.

29. An image processing method according to claim 19, further comprising:

second discriminating step of discriminating the structure of the background from the extracted region, and judging the type of the image data on the basis thereof.

30. An image processing method according to claim 19, further comprising:

step of judging presence or absence of character from the distribution of attribute in each region discriminated at the discriminating step, and judging the type of the image data on the basis thereof.

31. An image processing method according to claim 19, further comprising:

judging the type of the image data on the basis of the distribution of the attribute in each region discriminated at the discriminating step; and processing the data as specified on the basis of the type of the image data judged at the judging step.

32. An image processing method according to claim 19, further comprising:

second discriminating step of discriminating the page information which is the image type of each page of the original image of the image data when the discriminating step cannot divide the image data into a plurality of rectangular regions, and determining the type of the image data on the basis thereof.

33. An image processing method according to claim 19, further comprising:

second discriminating step of discriminating the page information which is the image type of each page of the original image of the image data when the region extracted at the discriminating step has a complicatedness more than a specific value, and determining the type of the image data on the basis thereof.

34. An image processing method according to claim 19, further comprising a judging step of judging the type of the image data, regardless of the content of the original mode given from the user, on the basis of the distribution of the attribute of each region discriminated at the discriminating step.

35. An image processing method according to claim 19, further comprising:

second discriminating step of discriminating the image information of the image data received from the input means in the pixel unit according to the judging result when the judging result at the judging step is the specified result; and processing step of processing the image data as specified on the basis of the discrimination result discriminated at the second discriminating step.

36. An image processing apparatus comprising:

input means for inputting image data of an original image;

discriminating means for extracting a predetermined region by using a feature of pixel of the image data input from the input means, and for discriminating an attribute of the region;

determining means for, on the basis of the distribution of the regions attributes of which are discriminated by the discriminating means, determining whether or not the type of the image data is a rectangular discriminative region; and conversion means for performing image conversion when the determining means determines that the predetermined region extracted by the discriminating means is the rectangular discriminative region, said conversion means converting the image to lower resolution or increasing a compression rate of the image where the attribute of the region discriminated by the discriminating means is one of a dot photo region and a continuous photo region, and converting multi-valued data of the image into binary data to reduce the quantity of information contained in each rectangular discriminative region when the attribute of the rectangular discriminative region is such that it contains only black characters.

37. An image processing apparatus according to claim 36, further comprising:

second discriminating means for discriminating the page information which is the image type of each page of the original image of the image data when the region extracted by the discriminating means has a complicatedness more than a specific value, and determining the type of the image data on the basis thereof.

* * * * *